(12) United States Patent
Kobayashi et al.

(10) Patent No.: US 8,818,630 B2
(45) Date of Patent: Aug. 26, 2014

(54) VIBRATION-DAMPING CONTROL DEVICE FOR VEHICLE

(75) Inventors: Yosuke Kobayashi, Yokohama (JP); Takeshi Kimura, Yokohama (JP); Yuuki Shiozawa, Sagamihara (JP); Mitsunori Ohta, Machida (JP); Hiroki Sasaki, Tokyo (JP); Akihiro Itoh, Atsugi (JP); Masahiko Yoshizawa, Odawara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/699,969

(22) PCT Filed: Apr. 20, 2011

(86) PCT No.: PCT/JP2011/059706
§ 371 (c)(1),
(2), (4) Date: Nov. 26, 2012

(87) PCT Pub. No.: WO2011/148739
PCT Pub. Date: Dec. 1, 2011

(65) Prior Publication Data
US 2013/0080012 A1    Mar. 28, 2013

(30) Foreign Application Priority Data

May 27, 2010 (JP) .................................. 2010-121322

(51) Int. Cl.
| G06F 17/00 | (2006.01) |
| G06F 19/00 | (2011.01) |
| B60T 8/00  | (2006.01) |
| B60T 8/173 | (2006.01) |

(52) U.S. Cl.
USPC .................. 701/38; 701/70; 701/90; 340/440

(58) Field of Classification Search
USPC ............. 701/1, 22, 36, 37, 38, 51, 53, 54, 55, 701/58, 60, 64, 65, 66, 67, 68, 70, 71, 74, 701/75, 82, 87, 90, 91, 93, 94; 340/438, 340/439; 180/170, 197
See application file for complete search history.

(56) References Cited

U.S. PATENT DOCUMENTS

| 4,744,589 A | 5/1988 | Buma et al. |
| 4,749,070 A | 6/1988 | Moser et al. |

(Continued)

FOREIGN PATENT DOCUMENTS

| EP | 2 078 653 A1 | 7/2009 |
| JP | 62-80108 A   | 4/1987 |

(Continued)

OTHER PUBLICATIONS

USPTO Notice of Allowance, U.S. Appl. No. 13/699,980, Aug. 30, 2013, 13 pages.

(Continued)

*Primary Examiner* — Thomas Tarcza
*Assistant Examiner* — Edward Pipala
(74) *Attorney, Agent, or Firm* — Foley & Lardner LLP

(57) ABSTRACT

A vehicular vibration damping control apparatus calculates a correction torque to suppress vehicle body sprung vibration. In outputting a correction torque command to a driving/braking torque producing device, the control apparatus outputs a hunting time correction torque command smaller than a normal time correction toque command when a state in which amplitude of the correction torque is greater than or equal to a predetermined amplitude continues for a predetermined time length, and thereafter to return an output of the correction torque command from the hunting time correction torque command to the normal time correction torque command if a state in which the amplitude of the correction torque is smaller than or equal to the predetermined amplitude continues for a first predetermined time length. The frequency of performing the vibration damping control is increased by suppressing occurrence of hunting at the time of return to the normal vibration damping control.

11 Claims, 13 Drawing Sheets

(56) References Cited

U.S. PATENT DOCUMENTS

| | | | |
|---|---|---|---|
| 5,631,829 A * | 5/1997 | Takasaki et al. | 701/69 |
| 5,868,474 A * | 2/1999 | Abe et al. | 303/140 |
| 6,026,338 A * | 2/2000 | Borschert et al. | 701/37 |
| 6,412,886 B1 * | 7/2002 | Abe et al. | 303/139 |
| 7,406,939 B2 * | 8/2008 | Asahara et al. | 123/192.1 |
| 7,885,740 B2 | 2/2011 | Izawa et al. | |
| 2004/0152558 A1 * | 8/2004 | Takami et al. | 477/3 |
| 2005/0065690 A1 * | 3/2005 | Ashizawa et al. | 701/51 |
| 2007/0101965 A1 * | 5/2007 | Asahara et al. | 123/192.1 |
| 2010/0241305 A1 * | 9/2010 | Itabashi et al. | 701/34 |
| 2011/0266760 A1 * | 11/2011 | Itabashi | 280/5.507 |
| 2012/0303243 A1 * | 11/2012 | Momose et al. | 701/102 |
| 2013/0073145 A1 | 3/2013 | Kobayashi et al. | |
| 2013/0090826 A1 | 4/2013 | Ohta et al. | |

FOREIGN PATENT DOCUMENTS

| | | |
|---|---|---|
| JP | 8-295151 A | 11/1996 |
| JP | 11-217200 A | 8/1999 |
| JP | 2009-127456 A | 6/2009 |
| JP | 2009-247157 A | 10/2009 |
| WO | WO-2011/148739 A1 | 12/2011 |
| WO | WO 2011/152269 A1 | 12/2011 |

OTHER PUBLICATIONS

USPTO Office Action, U.S. Appl. No. 13/699,980, Mar. 27, 2013, 13 pages.

USPTO Notice of Allowance, U.S. Appl. No. 13/700,512, Nov. 8, 2013, 14 pages.

* cited by examiner

VIBRATION-DAMPING CONTROL DEVICE FOR VEHICLE

TECHNICAL FIELD

The present invention relates to a vibration damping or vibration suppressing control device or apparatus for suppressing or restraining vibrations produced in a vehicle.

BACKGROUND ART

A patent document 1 discloses a vibration suppressing technique to calculate a vibration suppressing torque for suppressing sprung vibrations by using, as input variables, a driving torque and a wheel speed, and to decrease a control gain when a vibration amplitude of the vibration suppressing torque continues to be greater than or equal to a predetermined amplitude for a predetermined time length.

However, patent document 1 provides no explanation on restoration or return after the decrease of the control gain. Therefore, there might be a possibility of reoccurrence of hunting after restoration to the control. Moreover, a stoppage of the operation of the vibration suppressing control for a longer period of time to prevent reoccurrence of hunting may cause a decrease of frequency of performing the vibration suppressing control.

PRIOR ART LITERATURE

Patent Document(s)

Patent Document 1: JP2009-127456 A

SUMMARY OF THE INVENTION

It is an object of the present invention to provide a vibration damping or suppressing control apparatus for increasing the frequency of performing a vibration damping or suppressing control by suppressing occurrence of hunting at the time of return to a normal vibration damping control.

According to the present invention, a vibration damping control apparatus calculates a correction torque to suppress a vehicle body sprung vibration. In outputting a correction torque command based on the correction torque, to a driving/braking torque producing device, the vibration damping control apparatus outputs a hunting time correction torque command smaller than a normal time correction toque command when a state in which an amplitude of the correction torque is greater than or equal to a predetermined amplitude continues for a predetermined time length, and thereafter to return an output of the correction torque command from the hunting time correction torque command to the normal time correction torque command if a state in which the amplitude of the correction torque is smaller than or equal to the predetermined amplitude continues for a first predetermined time length.

Therefore, the vibration-damping control apparatus can prevent useless elongation of an inoperative time during which the vibration damping control is inoperative, and at the same time suppress occurrence of hunting at the time of return.

MODES FOR CARRYING OUT THE INVENTION

Embodiment 1

Figure 1:
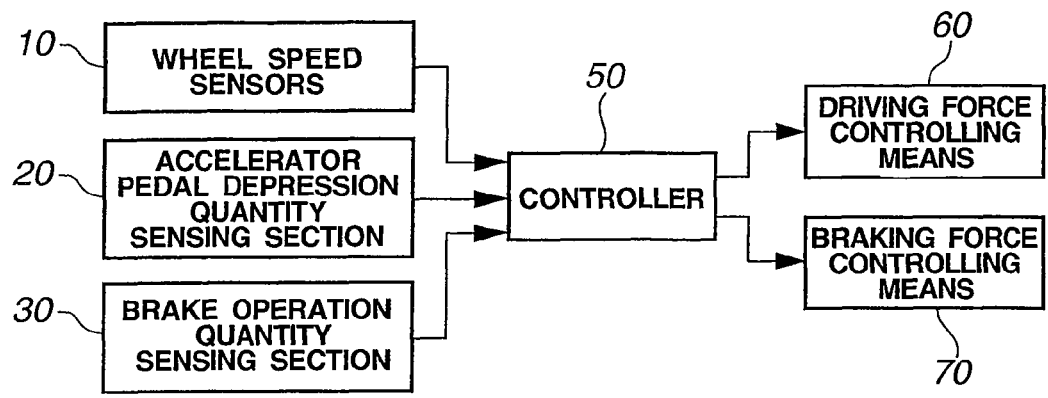
FIG. 1 is a system view showing the structure of a vibration damping apparatus according to a first embodiment.
Figure 2:
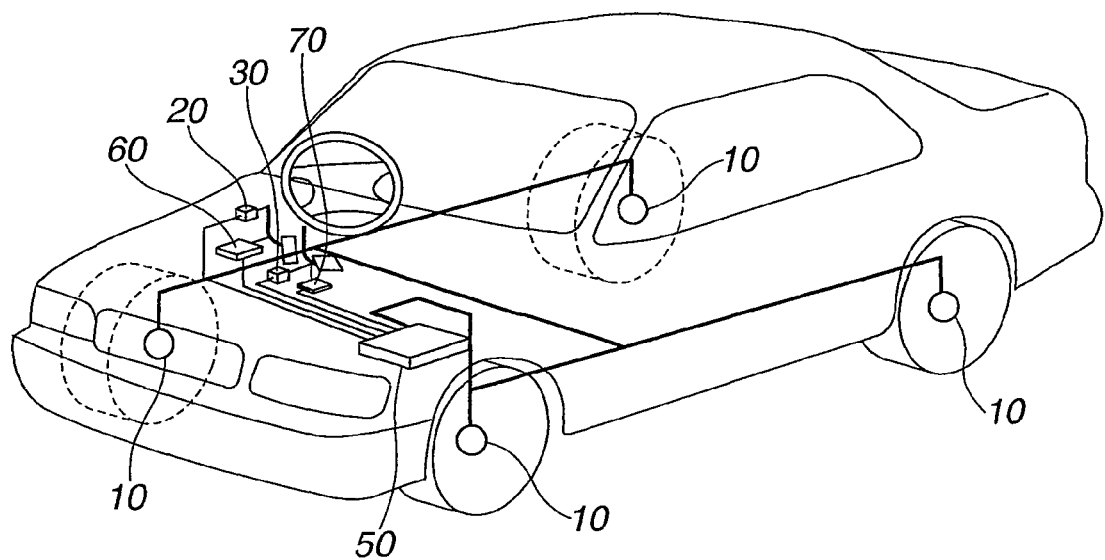
FIG. 2 is a structure view showing a vehicle equipped with the vibration damping apparatus according to the first embodiment.

FIG. 1 is a system view showing the structure of a vibration damping or suppressing apparatus according to an embodiment 1. FIG. 2 is a structure view showing a vehicle equipped with the vibration damping apparatus. First, explanation is directed to the structure of the vibration damping apparatus. Wheel speed sensors 10 sense the wheels speeds of respective wheels of the vehicle from the rpms of the respective wheels. An accelerator pedal depression quantity sensing section 20 senses an accelerator opening degree APO representing the depression quantity of an accelerator pedal by the driver. A brake operation quantity sensing section 30 senses a brake operation quantity S_b by the driver (such as a brake pedal stroke quantity or a depressing force on a brake pedal).

A controller 50 delivers control signals to a driving force controlling means or device 60 and a braking force controlling means or device 70 which are an actuator or actuators of the vibration-damping apparatus, in accordance with the state variables sensed by the sensors. In accordance with the accelerator opening degree APO inputted from accelerator pedal depression quantity sensing section 20 and the brake operation quantity S_b inputted from brake operation quantity sensing section 30, the controller 50 calculates a driving/braking (or longitudinal) torque requested by the driver (request driving/braking torques Te_a, Tw_b) (a request driving/braking torque calculating means or device 51). Furthermore, in accordance with the wheel speeds of the wheels inputted from wheel speed sensors 10, the controller 50 calculates disturbance acting on the tire of each wheel in a longitudinal direction or front and rear direction, from a variation of the wheel speed (a longitudinal disturbance calculating means or device 52). Controller 50 estimates a behavior of a vehicle body sprung part from the calculated request driving/braking torque and longitudinal disturbance (a sprung behavior estimating means or device 53). Then, controller 50 calculates a correction torque to suppress a vibration of the estimated vehicle body sprung part behavior (a correction torque calculating means or device 54), and adjusts an output in accordance with the calculated correction torque.

Controller 50 performs an output adjusting operation to the calculated correction torque, in accordance with a signal from a later-mentioned correction torque monitoring means or device 56 (output adjusting means or device 55). Moreover, control 50 changes over an output mode of the correction torque treated by the output adjusting operation, in accordance with a signal from the correction torque monitoring device 56 (mode changeover means or device 57), and outputs a correction torque command. Controller 50 monitors the correction torque adjusted by the output adjusting operation with output adjusting device 55 to examine whether the correction toque is in a condition of hunting, and delivers the result of the monitoring to output adjusting device 55 and mode changeover device 57 (correction torque monitoring means or device 56). Controller 50 delivers a calculated correction toque command to driving force controlling means or device 60 and braking force controlling means or device 70.

Figure 3:
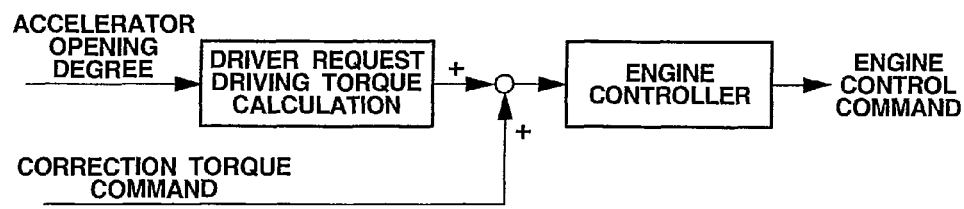
FIG. 3 is a block view showing the control structure of a driving force control device according to the first embodiment.
Figure 4:
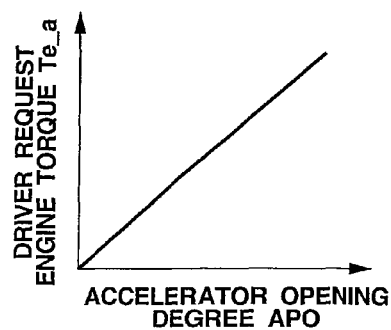
FIG. 4 is a view showing a map representing a driver request engine torque characteristic according to the first embodiment.

FIG. 3 is a block diagram showing the control structure of the driving force control device according to the first embodiment. Driving force control means or device 60 calculates a control command for the engine. The driving force control device calculates the driver request driving torque in accordance with accelerator opening degree APO, and calculates a target driving torque by adding the correction torque command outputted from controller 50, to the driver request driving torque. An engine controller calculates an engine control command in accordance with the target driving torque. FIG. 4 shows a map representing a characteristic of a driver request engine torque. The driver request driving torque is calculated by converting the driver request engine torque read out from the characteristic map defining the relationship between the accelerator opening degree APO and the driver request engine torque Te_a as shown in FIG. 4, into the toque at the driving shaft end, by using a differential gear ratio and a speed ratio of an automatic transmission.

Figure 5:
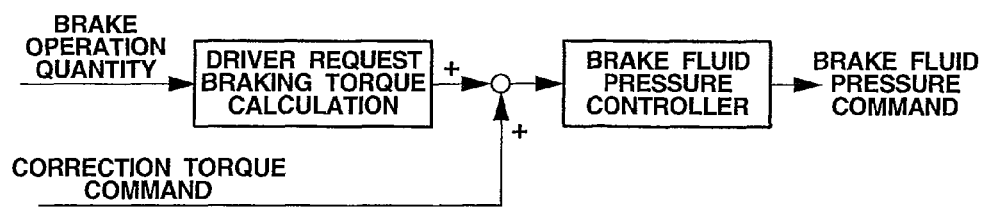
FIG. 5 is a block view showing the control structure of a braking force control device according to the first embodiment.
Figure 6:
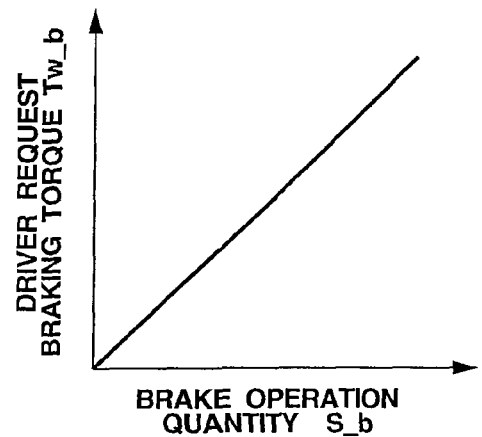
FIG. 6 is a view showing a map representing a driver request braking torque characteristic according to the first embodiment.

FIG. 5 is a block diagram showing the control structure of the braking force control device. Braking force control means or device 70 outputs a brake fluid pressure command. The braking force control device calculates the driver request braking torque Tw_b in accordance with the brake pedal operation quantity S_b, and calculates a target braking torque by adding the correction torque command inputted separately, to the driver request braking torque Tw_b. A brake fluid pressure controller calculates a brake fluid command in accordance with the target braking torque. FIG. 6 shows a map representing a characteristic of the driver request braking torque. The driver request braking torque is calculated by reading out the driver request braking torque from the characteristic map defining the relationship between the brake operation quantity S_b and the driver request braking torque as shown in FIG. 6.

Figure 7:
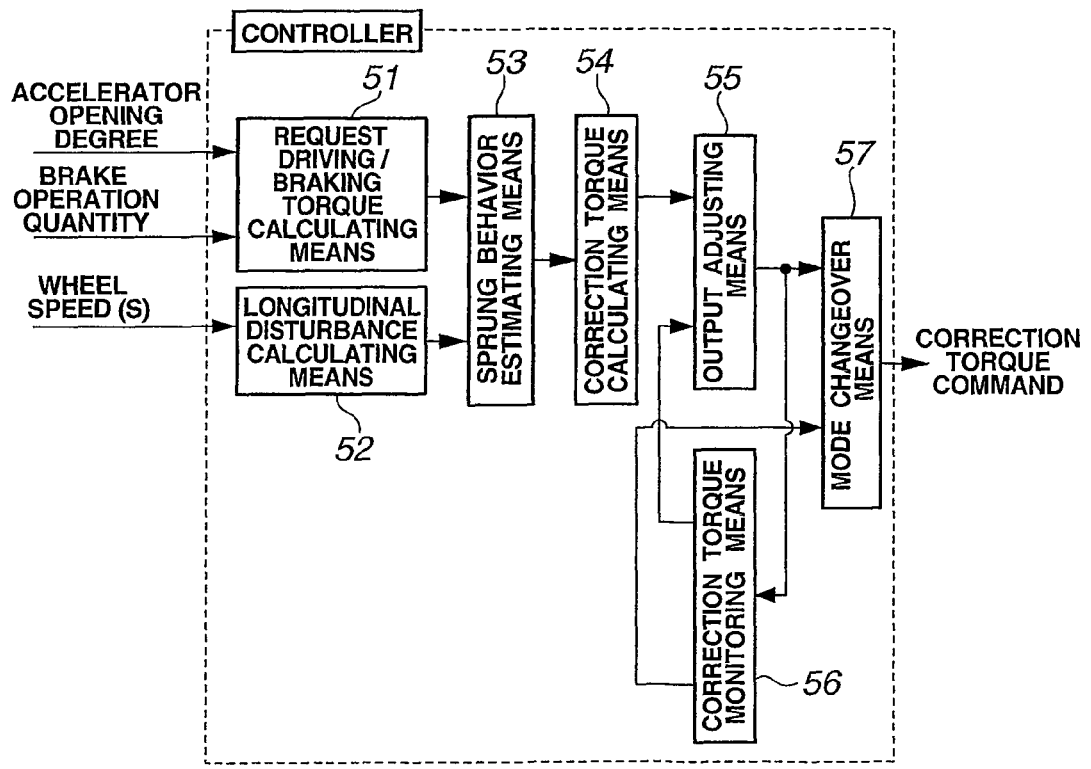
FIG. 7 is a block view showing operation performed in a controller in the vibration damping apparatus according to the first embodiment.

FIG. 7 is a block diagram showing operations performed by the controller in the vibration damping or suppressing control apparatus according to the first embodiment. A request driving/braking torque calculating means or device 51 receives the signals from the accelerator pedal depression quantity sensing section 20 and the brake operation quantity sensing section 30, and calculates the driving/braking torque requested by the driver. A longitudinal disturbance calculating means or device 52 calculates a longitudinal disturbance acting on the tire of each wheel in the longitudinal or front and rear direction, from variation of the wheel speed of each wheel, by using the wheel speed of each wheel inputted from wheel speed sensor 10. A sprung behavior estimating means or device 53 estimates a behavior of the vehicle body sprung part from the request driving/braking torque calculated by the request driving/braking torque calculating means or device 51 and the longitudinal disturbance calculated by the longitudinal disturbance calculating means 52.

Correction torque calculating means or device 54 calculates the correction torque to suppress vibrations of the behavior of the vehicle body sprung part estimated by sprung behavior estimating means 53. An output adjusting means or device 55 adjusts the output of the correction torque calculated by correction torque calculating means 54, in accordance with an output adjusting gain set by a later-mentioned correction torque monitoring means or device 56. The correction torque monitoring means 56 examines whether the correction torque signal is in a hunting state or not, by monitoring the correction torque adjusted by output adjusting means 55, and sets the output adjusting gain and an output mode. A mode changeover means or device 57 determines the correction torque command according to the output mode set by correction torque monitoring means 56.

The output adjusting means 55, correction toque monitoring means 56 and mode changeover means 55 form a characteristic part (corresponding to a correction toque command output means or device) of the present invention, arranged to correct the driving/braking toque so as to suppress the vehicle body sprung vibration due to the request driving/braking torque and longitudinal disturbance. That is, when a hunting state of the torque correction quantity (or the correction torque) is detected, the vibration damping control system stops the output of the correction torque, and restrains uncomfortable vibrations from being transmitted to the driver. When the hunting is settled, the vibration damping control system restores the output of the correction torque while imposing restriction on the correction torque. By so doing, the vibration damping control system prevents hunting from being repeated, restarts the output of the correction torque promptly, and increases the performing frequency of the vibration damping control.

Figure 8:
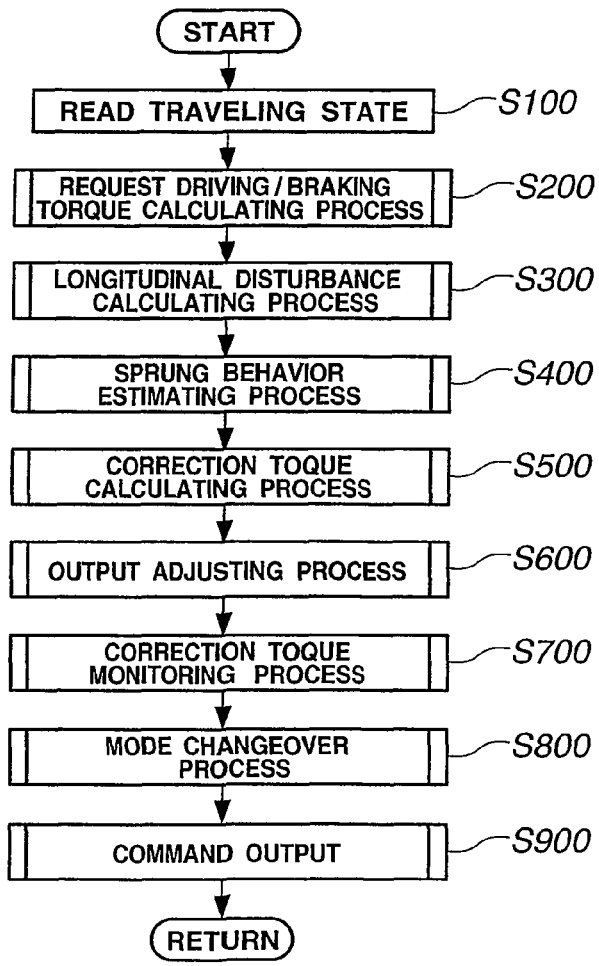
FIG. 8 is a flowchart showing the sequence of operations of a vibration damping control process in the controller according to the first embodiment.

FIGS. 8~17 show operations of the vibration damping control system according to the first embodiment. FIG. 8 is a flowchart showing the sequence of steps in a vibration damping control process in the controller according to the first embodiment. This control process is performed repetitively at regular time intervals of a predetermined length, for example 10 msec.

At a step S100, the controller reads the traveling or running state. The traveling state is information on operating condition of the driver and running conditions of the host vehicle which is the vehicle equipped with this control system. In this example, the controller reads the wheel speeds of the wheels sensed by wheel speed sensors 10, the accelerator opening degree APO sensed by accelerator pedal depression quantity sensing section 20 and the brake operation quantity S_b sensed by brake operation quantity sensing section 30.

At a step S200, the controller calculates the driver request driving/braking torque Tw in accordance with the driver' operating conditions read at S100, in a following manner.

The driver request engine torque Te_a is determined from accelerator opening degree APO by readout from the characteristic map defining the relationship between the accelerator opening degree and the driver request engine torque as shown in FIG. 4.

Te_a=map(APO)

The driver request driving torque Tw_a is calculated by converting the thus-determined driver request engine torque Te_a, into the driving shaft torque, by using the differential gear ratio Kdif and the gear ratio Kat of the automatic transmission.

Tw_a=(1/(Kdf·Kat))·Te_a

Similarly, the driver request braking torque Tw_b is determined from the operation quantity S_b of the brake pedal, according to the characteristic map defining the relationship between the brake operation quantity and the driver request braking torque as shown in FIG. 6.

The request driving/braking torque Tw is calculated from the calculated driver request driving torque Tw_a and the driver request braking torque Tw_b according to a following equation.

Tw=Tw_a-Tw_b

At a step S300, the controller calculates the longitudinal disturbance to be inputted to a later-mentioned motion model, in accordance with the wheel speeds of the wheels read at S100. The longitudinal disturbance in the longitudinal direction or front and rear direction is a force inputted to each wheel from the road surface. The longitudinal disturbance can be calculated in a following manner.

A wheel speed of each wheel with respect to the vehicle body is calculated by removing an actual vehicle speed component Vbody from each of the sensed wheel speeds $Vw_{FR}$, $Vw_{FL}$, $Vw_{RR}$ and $Vw_{RL}$. A wheel acceleration of each wheel is calculated by time differentiation by determining a difference between a current value and a previous valve of the wheel speed. Each of the front and rear longitudinal disturbances ΔFf and ΔFr of the front and rear wheels are calculated by multiplying the calculated wheel acceleration of each wheel by an unsprung mass.

At a next step S400, the controller estimates the sprung behavior from the request driving/braking torque Tw calculated at S200 and the longitudinal disturbances ΔFf and ΔFr calculated at S300.

Figure 9:
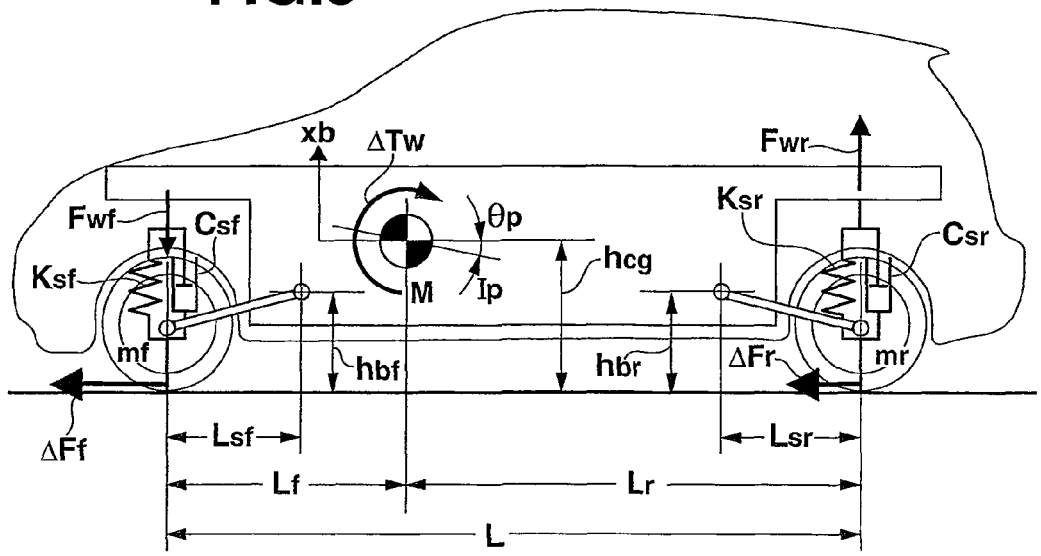
FIG. 9 is a schematic view showing a vehicle motion model in the first embodiment.

First, explanation is directed to the motion model in the first embodiment. FIG. 9 is a schematic view showing a vehicle motion model. This vehicle motion model is a front and rear two wheel model having front and rear suspensions with respect to the vehicle body. This vehicle motion model has, as parameters, a driving/braking torque variation ΔTw produced in the vehicle, the longitudinal disturbance ΔFf produced in the front wheel in dependence on road surface condition variation, driving/braking force variation and steering operation, and the longitudinal disturbance ΔFr produced in the rear wheel. This model is composed of suspension models having spring-damper system, corresponding to the front wheel and the rear wheel, and a vehicle body sprung model representing the quantity of movement, or displacement, of the center of gravity of the vehicle body.

Next, explanation is given, by the use of the vehicle model, about a situation where a driving/braking torque variation is produced in the vehicle, and a longitudinal disturbance is produced by addition, to a tire, of at least one of a road surface condition variation, a driving/braking force variation and a steering operation.

When at least one of the driving/braking torque variation ΔTw, and the longitudinal disturbances ΔFf and ΔFr is produced in the vehicle body, the vehicle body is rotated by an angle θp about the pitching axis, and at the same time, the center of gravity is moved through an up and down displacement xb. The driving/braking torque variation ΔTw is calculated from a difference between the driving/braking torque $Tw_n$ calculated from the driver's accelerator operation and brake operation, and a previous value $Tw_{n-1}$ of the driving/braking torque.

Following signs or symbols are used: a spring constant Ksf and a damping constant Csf of the front wheel's side suspension; a spring constant Ksr and a damping constant Csr of the rear wheel's side suspension; a link length Lsf and a link center height hbf of the front wheel's side suspension; a link length Lsr and a link center height hbr of the rear wheel's side suspension; a pitching inertia moment Ip of the vehicle body, a distance Lf between the front wheel and the pitching axis, a distance Lr between the rear wheel and the pitching axis, a height hcg of the center of gravity, and a sprung mass M. In this specification, for convenience of notation, in the case of the vector notation of each parameter, the time derivative d(parameter)/dt is expressed by a dot over the parameter in some cases. These two different notations are synonymous.

In this case, a motion equation, or equation of motion, of the up down vibration of the vehicle body is expressed as:

$$M \cdot (d^2xb/dt^2) = \\ -Ksf(xb + Lf \cdot \theta p) - Csf(dxb/dt + Lf \cdot d\theta p/dt) - Ksr(xb - Lr \cdot \theta p) - \\ Csf(dxb/dt - Lr \cdot d\theta p/dt) - (hbf/Lsf)\Delta Ff + (hbr/Lsr)\Delta Fr$$

Moreover, a motion equation, or equation of motion, of the pitching vibration of the vehicle body is expressed as:

$$Ip \cdot (d^2\theta p/dt^2) = -Lf \cdot Ksf(xb + Lf \cdot \theta p) - Lf \cdot Csf(dxb/dt + Lf \cdot d\theta p/dt) + \\ Lr \cdot Ksr(xb - Lr \cdot \theta p) + Lr \cdot Csf(dxb/dt - Lr \cdot d\theta p/dt) - \\ \{hcg - (Lf - Lsf)hbf/Lsf\}\Delta Ff + \{hcg - (Lr - Lsr)hbr/Lsr\}\Delta Fr$$

By converting these two motion equations into a state equation by setting x1=xb, x2=dxb/dt, x3=θp and x4=dθp/dt, a following expression is obtained:

$$dx/dt = Ax + Bu \quad\quad\quad 5$$

In this equation, each element is expressed as follows:

$$A = \begin{bmatrix} 0 & 1 & 0 & 0 \\ ab1 & ab2 & ab3 & ab4 \\ 0 & 0 & 1 & 0 \\ bb1 & bb2 & bb3 & bb4 \end{bmatrix}, \quad\quad \text{[Math 1]}$$

$$B = \begin{bmatrix} 0 & 0 & 0 \\ p1 & p2 & 0 \\ 0 & 0 & 0 \\ p3 & p4 & q \end{bmatrix},$$

$$x = \begin{bmatrix} xb \\ \dot{xb} \\ \theta p \\ \dot{\theta p} \end{bmatrix},$$

$$u = \begin{bmatrix} \Delta Ff \\ \Delta Fr \\ \Delta Tw \end{bmatrix}$$

$$ab1 = -(Ksf + Ksr)/M$$

$$ab2 = -(Csf + Csr)/M$$

$$ab3 = -(Lf \cdot Ksf - Lr \cdot Ksr)/M$$

$$ab4 = -(Lf \cdot Csf - Lr \cdot Csr)/M$$

$$bb1 = -(Lf \cdot Ksf - Lr \cdot Ksr)/Ip$$

$$bb2 = -(Lf \cdot Csf - Lr \cdot Csr)/Ip$$

$$bb3 = -(Lf^2 \cdot Ksf - Lr^2 \cdot Ksr)/Ip$$

$$bb4 = -(Lf^2 \cdot Csf - Lr^2 \cdot Csr)/Ip$$

$$p1 = -hbf/M/Lsf$$

$$p2 = hbr/M/Lsr$$

$$p3 = hcg/Ip - (Lf - Lsf)hbf/Lsf/Ip$$

$$p4 = hcg/Ip - (Lr - Lsr)hbr/Lsr/Ip$$

$$q = 1/Ip$$

Furthermore, the above-mentioned state equation is divided into a feed forward term (F/F term) receiving, as input, the driving/braking torque, and a feed back term (F/B term) receiving, as input, front wheel and rear wheel running disturbances, by the input signal.

The feed forward term is expressed as:

$$\dot{x} = Ax + B_{FF} \cdot \Delta Tw, \quad\quad \text{[Math 2]}$$

$$B_{FF} = \begin{bmatrix} 0 \\ 0 \\ 0 \\ q \end{bmatrix}$$

The feed back term is expressed as:

$$\dot{x} = Ax + B_{FB} \cdot \begin{bmatrix} \Delta Ff \\ \Delta Fr \end{bmatrix}, \quad\quad \text{[Math 3]}$$

$$B_{FB} = \begin{bmatrix} 0 & 0 \\ p1 & p2 \\ 0 & 0 \\ p3 & p4 \end{bmatrix}$$

By determining x, it is possible to estimate the behavior of the vehicle body sprung part by the driving/braking torque variation ΔTw and the longitudinal disturbances ΔFf and ΔFr.

At a step S500, the controller calculates a correction torque dTw* to suppress vehicle body vibration, in accordance with the sprung behavior estimated at S400. Following operations are performed in step S500.

The controller calculates the correction torque dTw* to be fed back to the request driving/braking torque, from the respective sprung behaviors x with respect to the variation component ΔTw of the request driving/braking torque Tw calculated at S200 and the front and rear wheel longitudinal disturbances ΔFf and ΔFr. In this case, the feedback gain is determined so as to reduce vibrations of dxb/dt and dθp/dt. When, for example, the feedback gain is calculated to decrease dxb/dt in the feed back term, a weighting matrix is set as:

$$Q_{xb\_FB} = \begin{bmatrix} 1 & 0 & 0 & 0 \\ 0 & 3e10 & 0 & 0 \\ 0 & 0 & 1 & 0 \\ 0 & 0 & 0 & 1 \end{bmatrix}, \quad\quad \text{[Math 4]}$$

$$R_{xb\_FB} = \begin{bmatrix} 1 & 0 \\ 0 & 1e15 \end{bmatrix}$$

And, a control input is an input to minimize in a following equation.

$$J = \int_0^\infty (x^T(t) Q_{xb\_FB} x(t) + u^T(t) R_{xb\_FB} u(t)) dt \quad\quad \text{[Math 5]}$$

The solution is given by a mathematical expression 7, on the basis of a positive symmetric solution p of a Riccati algebraic equation expressed as:

$$A^T p + pA - pB R_{xb\_FB}^{-1} B^T p + Q_{xb\_FB} = 0 \quad\quad \text{[Math 6]}$$

$$u(t) = -F_{xb\_FB} x(t), F_{xb\_FB} = R_{xb\_FB} B^T p \quad\quad \text{[Math 7]}$$

In this expression, $F_{xb\_FB}$ is a feedback gain matrix with respect to dxb/dt in the feed back term.

It is possible to calculate a feedback gain $F_{thp\_FB}$ to reduce vibration of dθp/dt in the feedback term, and feedback gains $F_{xb\_FF}$ and $Ff_{thp\_FF}$ in the feed forward term to reduce dxb/dt and dθp/dt, respectively, in the same manner.

In the case of the feedback gain $F_{thp\_FB}$ to reduce the vibration of dθp/dt in the feed back term, a weighting matrix is set as:

$$Q_{thp\_FB} = \begin{bmatrix} 1 & 0 & 0 & 0 \\ 0 & 1 & 0 & 0 \\ 0 & 0 & 1 & 0 \\ 0 & 0 & 0 & 5e10 \end{bmatrix}, \quad\quad \text{[Math 8]}$$

-continued $$R_{thp\_FB} = \begin{bmatrix} 1 & 0 \\ 0 & 1e15 \end{bmatrix}$$

The feedback gain $F_{thp\_FB}$ to reduce the vibration of $d\theta p/dt$ in the feed back term is calculated by, $$F_{thp\_FB} = R_{thp\_FB} B^T p \quad \text{[Math 9]}$$

Similarly, in the case of the feedback gain $F_xb\_FF$ to reduce $dxb/dt$ in the feed forward term, a weighting matrix is set as:

$$Q_{xb\_FF} = \begin{bmatrix} 1 & 0 & 0 & 0 \\ 0 & 1e9 & 0 & 0 \\ 0 & 0 & 1 & 0 \\ 0 & 0 & 0 & 1 \end{bmatrix}, \quad \text{[Math 10]}$$

$$R_{xb\_FF} = [1]$$

The feedback gain $F_{xb\_FF}$ to reduce $dxb/dt$ in the feed forward term is calculated by, $$F_{xb\_FF} = R_{xb\_FF} B^T p \quad \text{[Math 11]}$$

In the case of the feedback gain $F_{xb\text{-}FF}$ to reduce $dxb/dt$, $d\theta p/dt$ in the feed forward term, a weighting matrix is set as:

$$Q_{thp\_FF} = \begin{bmatrix} 1 & 0 & 0 & 0 \\ 0 & 1 & 0 & 0 \\ 0 & 0 & 1 & 0 \\ 0 & 0 & 0 & 1e9 \end{bmatrix}, \quad \text{[Math 12]}$$

$$R_{thp\_FF} = [1]$$

The feedback gain $F_{thp\_FF}$ is calculated by, $$F_{thp\_FF} = R_{thp\_FF} B^T p \quad \text{[Math 13]}$$

This is a method of optimal regulator. However, it is optional to employ a design by another method such as pole assignment.

The correction torque $dTw^*$ is calculated by weighting and adding the correction torques determined by the above-mentioned four equations.

At a step S600, the controller preforms the output adjusting process to the correction toque $dTw^*$ calculated at S500, and thereby calculates an after-adjustment correction torque $dTw_1^*$ or adjusted correction torque $dTw_1^*$.

$$dTw_1^* = \frac{Kout}{100} \cdot dTw^* \quad \text{[Math 14]}$$

In this equation, Kout is an output adjusting gain. This output adjusting gain Kout is set at a step S700. An initial value of Kout is set equal to 100, for example, in order to enable calculation in a first routine at the time of start of controller 50 and other situations. A correction torque command dTw_out* at the time when output adjusting gain Kout is equal to 100 is defined as a normal time correction torque command.

Figure 10:
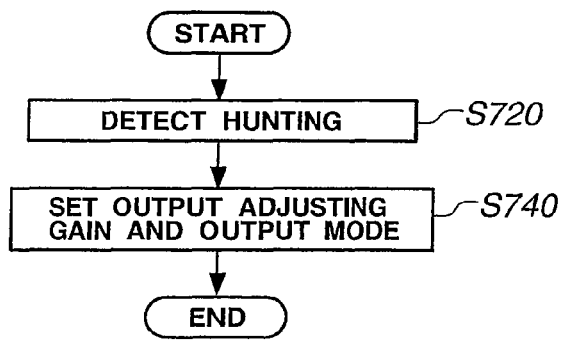
FIG. 10 is a flowchart showing a process of setting an output adjusting gain and an output mode in the first embodiment.

At step S700, the controller sets the output adjusting gain Kout and the output mode in accordance with the after-adjustment correction torque $dTw_1^*$ calculated at S600. FIG. 10 shows the process performed at S700, in the form of a flowchart.

[Correction Torque Monitoring Process]

FIG. 10 is a flowchart showing a process of setting the output adjusting gain and the output mode in the first embodiment.

At a step S720, the controller detects hunching of the after-adjustment correction torque $dTw_1^*$. The process of S720 is illustrated in FIGS. 11~15.

Figure 11:
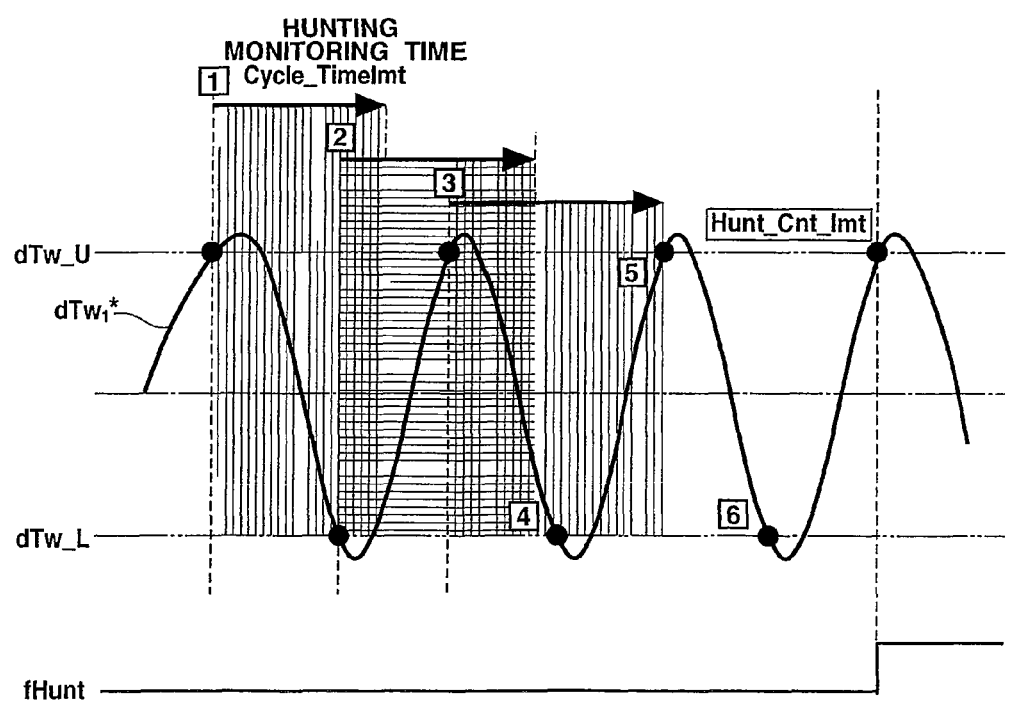
FIG. 11 is a conceptual view illustrating a hunting detecting method in the first embodiment.
Figure 12:
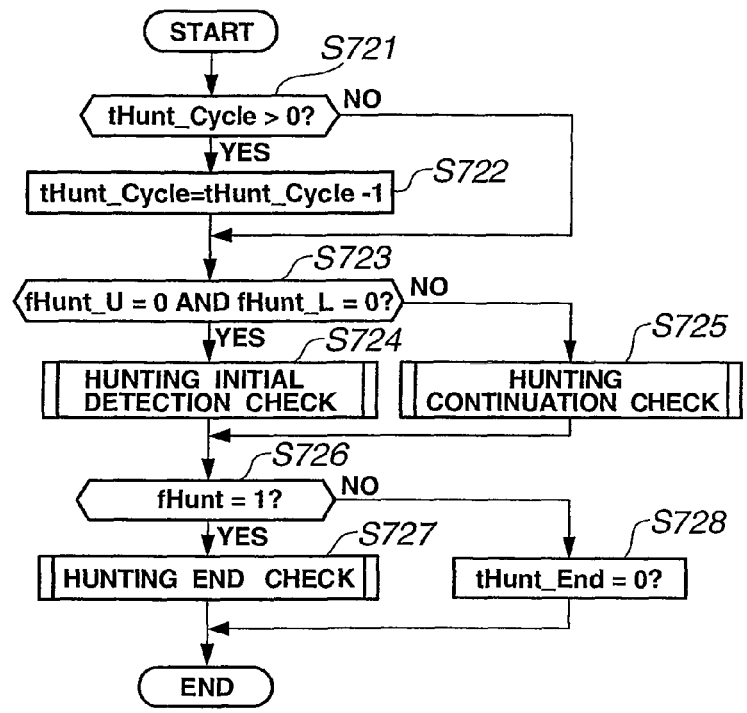
FIG. 12 is a flowchart showing a hunting detecting process according to the first embodiment.

FIG. 11 is a conceptual diagram illustrating a hunting detecting method in the first embodiment. The controller counts the number of times of overshoot of the after-adjustment correction toque $dTw_1^*$ beyond a predetermined correction torque upper limit threshold dTw_U (or a predetermined correction toque lower limit threshold dTw_L). When the counted number of times becomes equal to a hunting judgment number Hunt_Cnt_lmt, then the controller judges that the hunting state is present, and sets a hunting flag fHunt to one. In the example of FIG. 11, the hunting judgment number Hunt_Cnt_lmt is set equal to 7. The count is performed when the after-adjustment correction torque $dTw_1^*$ exceeds the correction torque threshold dTw_L (or dTw_U) within a hunting monitoring time period Cycle_Timelmt from an overshoot of the after-adjustment correction torque dTw1* beyond the correction torque threshold dTw_U (or dTw_L). When the after-adjustment correction torque dTw1* does not exceed the correction torque threshold within the hunting monitoring time period Cycle_Timelmt, then the controller judges that the hunting state is not present, and clears the counter.

[Hunting Detecting Process]

FIGS. 12~15 are views used for detailed explanation on the hunting detecting process. FIGS. 12~15 are flowcharts showing the hunting detecting process according to the first embodiment.

Figure 13:
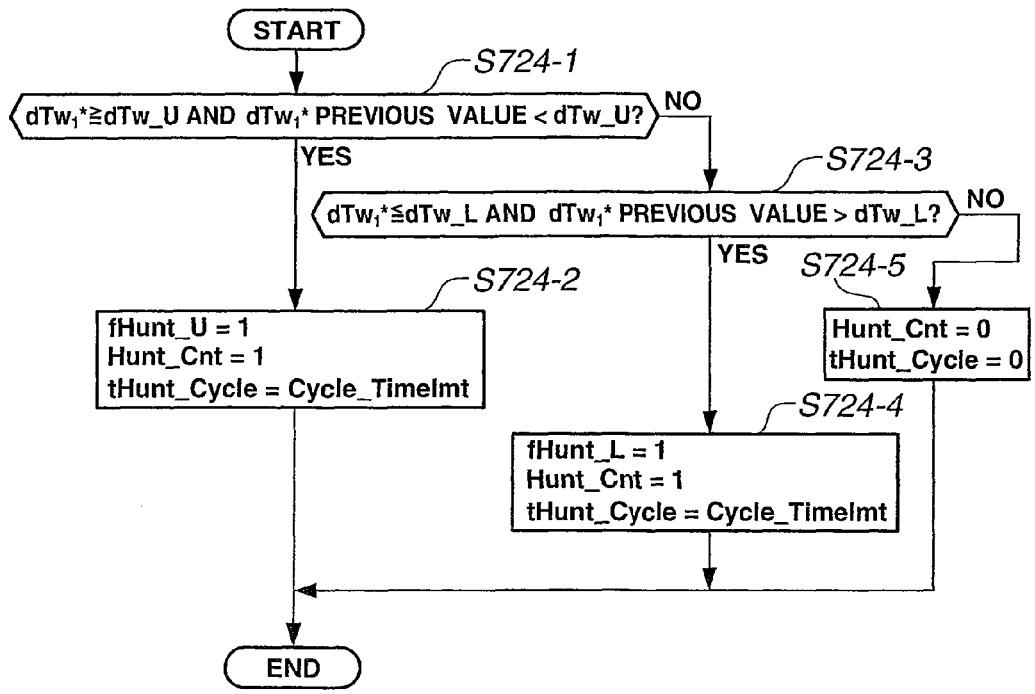
FIG. 13 is a flowchart showing the hunting detecting process according to the first embodiment.

At a step S721, the controller examines whether a hunting monitoring timer tHunt_Cycle is positive or not. In the case of YES, the controller decreases the hunting monitoring timer tHunt_Cycle by one, at a step S722. In the case of NO at S721, the controller proceeds from 5721 directly to a step S723. At step S723, the controller examines whether an upper limit threshold reaching flag fHunt_U is equal to zero and a lower limit threshold reaching flag fHunt_L is equal to zero, or not. In the case of YES, the controller performs a hunting initial detection check at a step S724. FIG. 13 is a flowchart showing the hunting initial detection check performed at S724.

(Hunting Initial Detection Check)

At a step S724-1, the controller examines whether the after-adjustment correction torque $dTw_1^*$ is equal to or greater than the correction torque upper limit threshold dTw_U, and a previous value of the after-adjustment correction torque $dTw_1^*$ is smaller than the correction torque upper limit threshold dTw_U. In the case of YES, the controller proceeds from S724-1 to a step S724-2. At step S724-2, the controller sets the upper limit threshold reaching flag fHunt_U to one, sets the hunting count Hunt_Cnt to one, and sets the hunting monitoring timer tHunt_Cycle equal to the hunting monitoring time period Cycle_Timelmt. Thereafter, the controller terminates the process of FIG. 13.

In the case of NO at step S724-1, the controller proceeds from S724-1 to a step S724-3, and examines whether the after-adjustment correction torque $dTw_1^*$ is equal to or smaller than the correction torque lower limit threshold dTw_L, and a previous value of the after-adjustment correction torque $dTw_1^*$ is greater than the correction torque lower limit threshold dTw_L. In the case of YES, the controller proceeds from S724-3 to a step S724-4. At step S724-4, the controller sets the lower limit threshold reaching flag fHunt_L to one, sets the hunting count Hunt_Cnt to one, and sets the hunting monitoring timer tHunt_Cycle equal to the hunting monitoring time period Cycle_Timelmt. Thereafter, the controller terminates the process of FIG. 13.

In the case of NO at step S724-3, the controller proceeds to a step S724-5, the controller clears the hunting count Hunt_Cnt and the hunting monitoring timer tHunt_Cycle, and thereafter terminates the process of FIG. 13.

Figure 14:
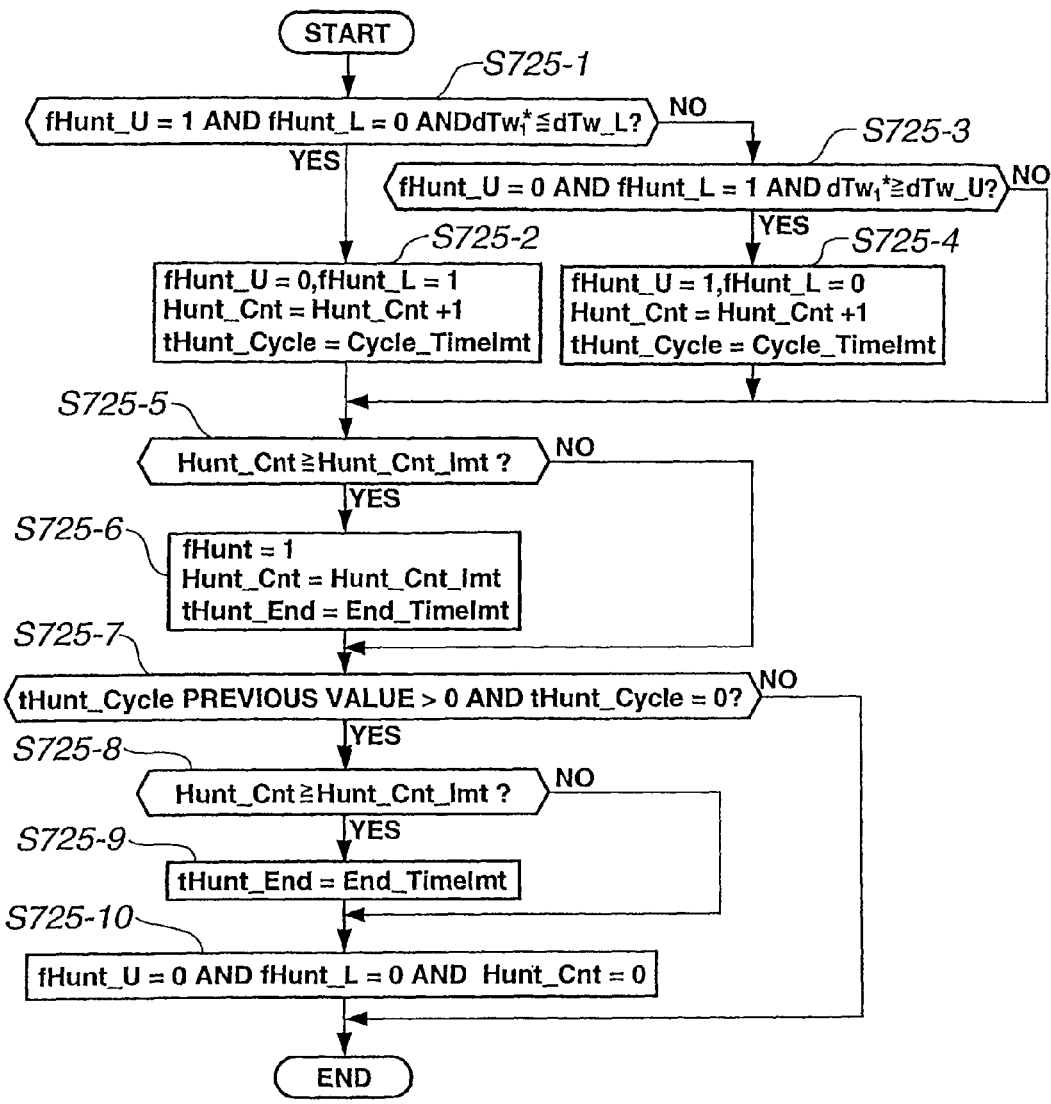
FIG. 14 is a flowchart showing the hunting detecting process according to the first embodiment.

In the case of NO at step S723, the controller performs a hunting continuation check at a step S725. FIG. 14 is a flowchart showing this process of step S725.

(Hunting Continuation Check Process)

At a step S725-1, the controller examines whether the upper limit threshold reaching flag fHunt_U is equal to one, the lower limit threshold reaching flag fHunt_L is equal to zero, and the after-adjustment correction torque $dTw_1^*$ is equal to or lower than the correction torque lower limit threshold dTw_L. In the case of YES, at a step S725-2, the controller resets the upper limit threshold reaching flag fHunt_U to zero, sets the lower limit threshold reaching flag fHunt_L to one, sets the hunting monitoring timer tHunt_Cycle to the hunting monitoring time period Cycle_Timelmt, and adds one to the hunting count Hunt_Cnt. Thereafter, the controller proceeds to a step S725-5.

In the case of NO at step S725-1, the controller proceeds from S725-1 to a step S725-3, and the controller examines whether the upper limit threshold reaching flag fHunt_U is equal to zero, the lower limit threshold reaching flag fHunt_L is equal to one, and the after-adjustment correction torque $dTw_1^*$ is equal to or greater than the correction torque upper limit threshold dTw_U. In the case of Yes, the controller proceeds to a step S725-4. At S725-4, the controller sets the upper limit threshold reaching flag fHunt_U to one, resets the lower limit threshold reaching flag fHunt_L to zero, sets the hunting monitoring timer tHunt_Cycle to the hunting monitoring time period Cycle_Timelmt, and adds one to the hunting count Hunt_Cnt. Thereafter, the controller proceeds to the step S725-5. In the case of NO at step S725-3, the controller proceeds from S725-3 directly to the step S725-5.

At the step S725-5, the controller examines whether the hunting count Hunt_Cnt is equal to or greater than the hunting judgment number Hunt_Cnt_lmt. In the case of YES, the controller proceeds to a step S725-6. At step S725-6, the controller sets the hunting flag fHunt to one on the assumption that the hunting state is present, sets the hunting count Hunt_Cnt equal to the hunting judgment number Hunt_Cnt_lmt, and sets a discontinuation return timer tHunt_End equal to a return time period End_Timelmt (corresponding to a first time period T1). In the case of NO at step S725-5, the controller proceeds directly from S725-5 to a step S725-7.

At step S725-7, the controller examines whether the previous value of hunting monitoring timer tHunt_Cycle is positive and the hunting monitoring timer tHunt_Cycle is equal to zero. In the case of No, the controller terminates the process of FIG. 14 directly. In the case of YES, the controller proceeds from S725-7 to a step S725-8, and the controller examines whether the hunting count Hunt_Cnt is equal to or greater than the hunting judgment number Hunt_Cnt_lmt. In the case of YES, at a step S725-9, the controller sets the discontinuation return timer tHunt_End equal to a return time period End_Timelmt. In the case of NO at S725-8, the controller proceeds from S725-8 directly to a step S725-10. At step S725-10, the controller clears the upper limit threshold reaching flag fHunt_U, the lower limit threshold reaching flag fHunt_L and the hunting count Hunt_Cnt, and thereafter terminates the process of FIG. 14.

Figure 15:
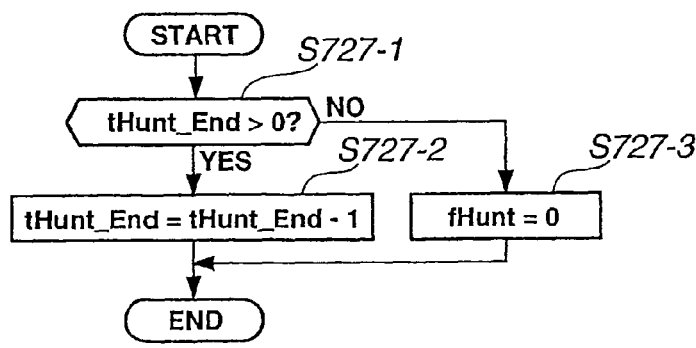
FIG. 15 is a flowchart showing the hunting detecting process according to the first embodiment.

At a step S726, the controller examines whether the hunting flag fHunt is equal to one or not. In the case of YES, the controller proceeds to a step S727 and performs a hunting end check. In the case of NO, the controller clears the discontinuation return timer tHunt_End at a step S728, and then terminates the process of FIG. 12. FIG. 15 shows the hunting end check process performed at step S727 in the form of a flowchart.

(Hunting End Check Process)

At a step S727-1, the controller examines whether the discontinuation return timer tHunt_End is positive or not. In the case of YES, the controller proceeds to a step S727-2. At step S727-2, the controller decreases the discontinuation return timer tHunt_End by one, and terminates the process of FIG. 15. In the case of NO, the controller judges that the hunting state ends, and clears the hunting flag fHunt at a step S727-3, and then terminates the process of FIG. 15.

(Output Adjusting Gain and Output Mode Setting Process)

Figure 16:
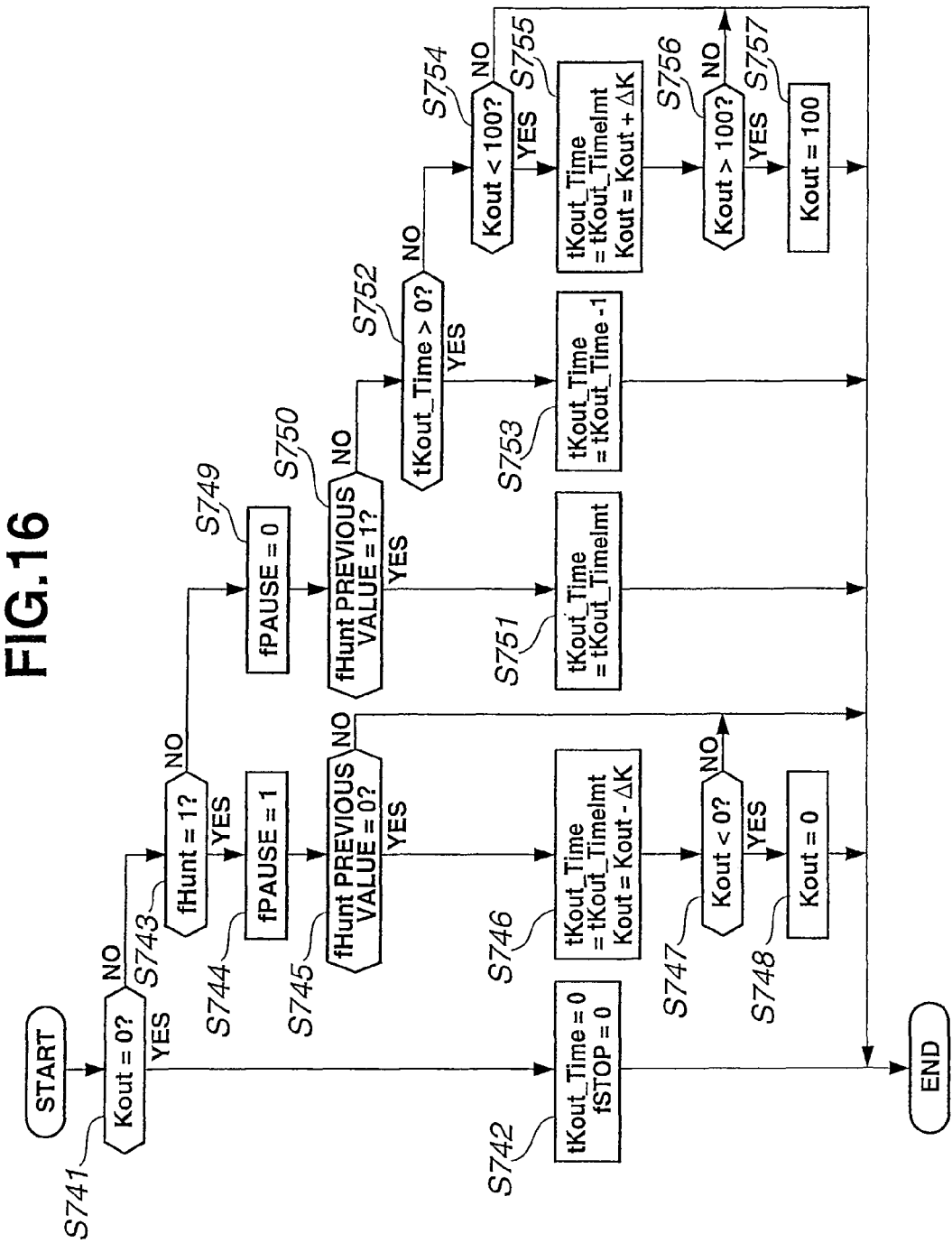
FIG. 16 is a flowchart showing the process according to the first embodiment, for setting the output adjusting gain and output mode.

At the step S740, the controller sets the output adjusting gain and the output mode, in accordance with the hunting result detected at step S720. FIG. 16 shows, in the form of a flowchart, a process of setting the output adjusting gain and the output mode according to the first embodiment. The process of step S740 is explained by using FIG. 16.

At a step S741, the controller examines whether the output adjusting gain Kout is zero or not. In the case of YES, the controller proceeds to a step S742. At step S742, the controller resets an output adjusting gain return timer tKout_Time to zero, and sets a control stop flag fSTOP to one. When the control stop flag fSTOP is set at one, the output is not returned or resumed even if the hunting state ends.

In the case of NO at S741, the controller proceeds to a step S743, and examines whether the hunting flag fHunt is one or not. In the case of YES, the controller proceeds to a step S744, and sets a control pause flag fPAUSE to one on the assumption that the hunting state is present. At a step S745, the controller examines whether the previous value of the hunting flag fHunt is zero or not. In the case of NO, the controller terminates the process of FIG. 16 directly. In the case of YES, at a step S746, the controller sets the output adjusting gain return timer tKout_time equal to an output adjusting gain return time period tKout_Timelmt (corresponding to a second predetermined time period T2), and subtracts, from the output adjusting gain Kout, a predetermined quantity ΔK. This subtraction of ΔK from the output adjusting gain Kout is one of characteristic features of the present invention. The correction torque command dTw_out* calculated from the difference resulting from subtraction of ΔK from output adjusting gain Kout is defined as a returning time correction torque command. By setting in this way, it is possible to avoid judgment of hunting again, and to restore the output while imposing restriction at the time of restoration or return of the output of the correction torque command.

At a step S747, the controller examines whether the output adjusting gain Kout is negative or not. In the case of YES, the controller sets the output adjusting gain to zero at a step S748, and then terminates the process of FIG. 16. In the case of NO, the controller terminates the process directly.

In the case of NO at S743, the controller proceeds to a step S749, and resets the control pause flag fPAUSE to zero on the assumption that the hunting state ends.

At a step S750, the controller examines whether the previous value of the hunting flag fHunt is equal to one or not. In the case of YES, the controller proceeds to a step S751, and sets the output adjusting gain return timer tKout_Time equal to the output adjusting gain return time period tKout_Timelmt. In the case of NO, the controller proceeds to a step S752, and examiners whether the output adjusting gain return timer tKout_Time is positive or not.

In the case of YES at S752, the controller proceeds to a step S753, and decreases the output adjusting gain return timer tKout_Time by one. In the case of NO, the controller proceeds to a step S754, and examines whether the output adjusting gain Kout is smaller than 100 or not. In the case of NO, the controller terminates the process directly.

In the case of YES at S754, the controller proceeds to a step S755, and sets the output adjusting gain return timer tKout_Time equal to the output adjusting gain return time period tKout_Timelmt, and adds the predetermined quantity ΔK to the output adjusting gain Kout.

At a step S756, the controller examines whether the output adjusting gain Kout is greater than 100 or not. In the case of NO, the controller terminates the process directly. In the case of YES, the controller set the output adjusting gain Kout equal to 100 at a step S757, and then terminates the process.

[Mode Changeover Process]

Figure 17:
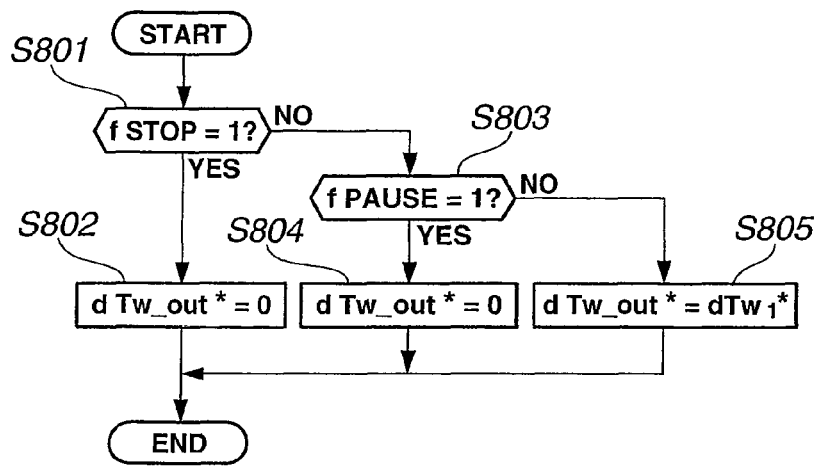
FIG. 17 is a flowchart showing a mode changeover process according to the first embodiment.

At a step S800, the controller calculates the correction torque command dTw_out* according to the output mode set at the step S700. FIG. 17 shows the mode changeover process according to the first embodiment in the form of a flowchart.

At a step S801, the controller examines whether the control stop flag fSTOP is equal to one or not. In the case of YES, the controller proceeds to a step S802, sets the correction torque command dTw_out* equal to zero, and terminates the process. In the case of NO, the controller proceeds to a step S803.

At step S803, the controller examines whether the control pause flag fPAUSE is one or not. In the case of YES, the controller sets the correction torque command dTw_out* equal to zero, and terminates the process. The value of zero to which the correction torque command dTw_out* is set at S804 corresponds to a hunting time correction torque command. In the case of NO, the controller sets the correction torque command dTw_out* equal to the after-adjustment correction torque dTw1*.

[Command Output Process]

At a step S900, the controller outputs the correction torque command dTw_out* calculated at step S800, to the driving force control means 60 and the braking force control means 70. Thereafter, the controller terminates the current cycle of the process.

[Operation by the Vibration Damping Control Process]

Figure 18:
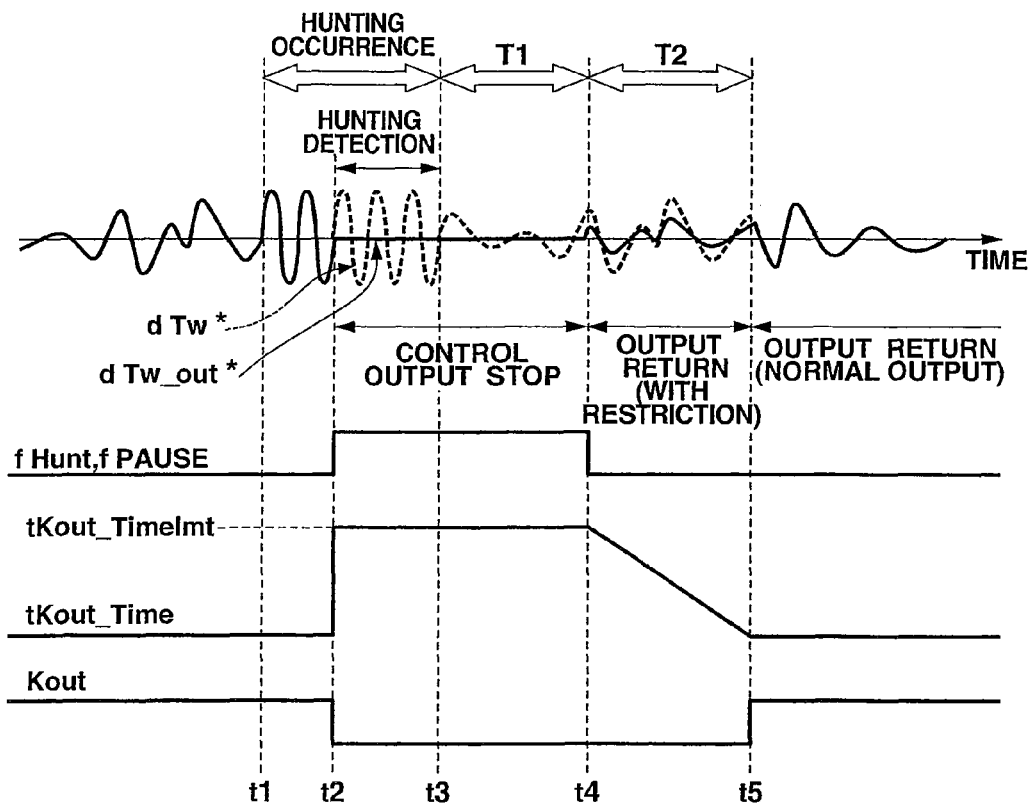
FIG. 18 is a time chart for illustrating operations when the vibration damping control process according to the first embodiment is performed.

FIG. 18 illustrates, in the form of a time chart, operations of the vibration damping control process according to the first embodiment. In the example of FIG. 18, a hunting state is generated in the correction torque command in the vibration damping control to suppress vibrations produced in the vehicle during travel on a rough road.

At an instant t1, the correction torque command based on the vibration damping control increases the amplitude and thereby starts hunting oscillation by the influence of the rough road.

At an instant t2, the continuation of the hunting state amounts to a predetermined time length or period, and the control system sets the hunting flag fHunt and the control pause flag fPAUSE (at steps S725-6, S744). The control system sets the output adjusting gain return timer tKout_Time equal to the output adjusting gain return time period tKout_Timelmt, and sets the output adjusting gain Kout to a value resulting from subtraction of the predetermined quantity ΔK (at step S746). Then, since the control pause flag fPAUSE is set, the control system outputs the correction torque command dTw_out* set equal to 0, to the actuator (step S803→S804) even if the correction torque dTw* continues hunting. This correction torque command dTw_out* corresponds to "correction torque command" recited in the claims.

At an instant t3 when it is judged that the hunting of correction toque dTw* has subsided, the control system sets the discontinuation return timer tHunt_End equal to the return time period End_Timelmt (corresponding to a first predetermined time period T1) (at step S725-9), and checks the continuation of the state in which the hunting is settled, for the return time period End_Timelmt.

At an instant t4 when the return time period End_Timelmt has elapsed from instant t3, the control system resets the hunting flag fHunt and the control pause flag fPAUSE (at steps S727-2 and S749). The control system sets, as the correction torque command dTw_out*, the correction torque dTw1* calculated on the basis of the output adjusting gain reduced by subtraction, and outputs the thus-set correction torque dTw1* as the correction torque command to the actuator. The control system starts the decreasing operation of the output adjusting gain return time period tKout_Timelmt.

During the period until the expiration of the output adjusting gain return time period tKout_Timelmt after instant t4, the control system outputs the correction torque command dTw_out* with restriction. By so doing, the control system can prevent reoccurrence of hunting as compared to abrupt return of the correction torque command to the normal correction toque command, and shorten the continuation of the lowered output state.

At an instant t5 when the output adjusting gain return time period tKout_Timelmt has elapsed without detection of hunting despite the output of the restricted correction torque command dTw_out*, the control system sets the output adjusting gain Kout to the value resulting from addition of the predetermined quantity ΔK (at step S755). Thus, by removing the restriction, and outputting the normal correction torque command, the control system can suppress hunting, make shorter the control pause state, and prevent reoccurrence of hunting at the time of return to the control.

As explained above, the first embodiment can provide following effects and advantages.

(1) A vibration damping control apparatus comprises: a driving force controlling means or device 60 and a braking force controlling means or device (a driving/braking torque producing means or device) to produce a driving/braking torque in a wheel; a correction torque calculating means or device 54 to calculate a correction torque to suppress a vehicle body sprung vibration; an output adjusting means or device 55, a correction torque monitoring means or device 56 and a mode selecting or changeover means or device 57 (herein after referred to as a correction torque command outputting means or device), to output a correction torque command to the driving force controlling device 60 and the braking force controlling device 70, in accordance with the correction torque. The correction toque outputting device outputs a hunting time correction torque command smaller than a normal time correction toque command in amplitude when a state in which an amplitude of the correction torque is greater than or equal to a predetermined amplitude continues for a predetermined time length, and thereafter to return an output of the correction torque command from the hunting time correction torque command toward the normal time correction torque command when a state in which the amplitude of the correction torque is smaller than or equal to the predetermined amplitude continues for a return time period End_Timelmt (a first predetermined time length).

Thus, if, after a decrease of the output of the correction torque in response to occurrence of hunting, no hunting is generated in the calculated correction torque dTw*, then the output of the correction torque command is returned to the normal time correction torque command. Therefore, the control system can prevent the time during which vibration damping control is inoperative, from being elongated uselessly, and can lower the possibility of hunting at the time of return. In the first embodiment, the hunting time correction torque command is set equal to zero. However, instead of setting to zero, it is optional to set the output adjusting gain to a very small value, to impart a predetermined constant control quantity, or to a predetermined frequency control quantity. In any case, it is desirable to output the command capable of suppressing hunting in accordance with a predetermined control quantity.

(2) Before the output of the correction torque command is returned to the normal correction torque command, the correction toque outputting means or device outputs the correction toque command dTw_out* by using a value obtained by subtracting ΔK from the output adjusting gain Kout. That is, the correction toque outputting means or device resumes the output while imposing restriction on the correction torque dTw* (a returning time correction torque command).

When, for example, hunting is produced in the correction torque command during travel on a rough road, there is a high possibility of reoccurrence of hunting after settlement of hunting. In this case, by resuming the output with restriction imposed on the output, the control system can prevent reoccurrence of hunting as compared to the return without restriction, and can shorten the inoperative time during which the vibration damping control is inoperative.

(3) The correction toque outputting device imposes the restriction so as to decrease the output of the correction torque as compared to the state in which the amplitude of the correction torque is smaller than or equal to the predetermined amplitude. Concretely, the correction toque outputting device outputs the correction torque command dTw_out* by the use of the value obtained by subtracting ΔK from the output adjusting gain Kout. Therefore, the control system can prevent reoccurrence of hunting, and shorten the inoperative time during which the vibration damping control is inoperative.

(4) The correction toque outputting means or device returns the output of the correction torque command from the returning time correction torque command to the normal time correction torque command when the state in which the amplitude of the correction torque dTw* is smaller than or equal to the predetermined amplitude continues for an output adjusting gain return time period tKout_Timelmt (a second predetermined time length) while the returning time correction torque command is being outputted.

Thus, the control system examines whether hunting is generated or not in the correction torque dTw* in the state in which the returning time correction toque command which is a restricted command, is outputted. By so doing, the control system can prevent reoccurrence of hunting more effectively as compared to the return to the normal time correction toque command immediately. Moreover, the control system can lower the possibility of reoccurrence of hunting at the time of return of the output to the normal time correction torque command, and prevent the inoperative time making the vibration damping control is inoperative, from being decreased too short by outputting the restricted correction toque.

Embodiment 2

Figure 19:
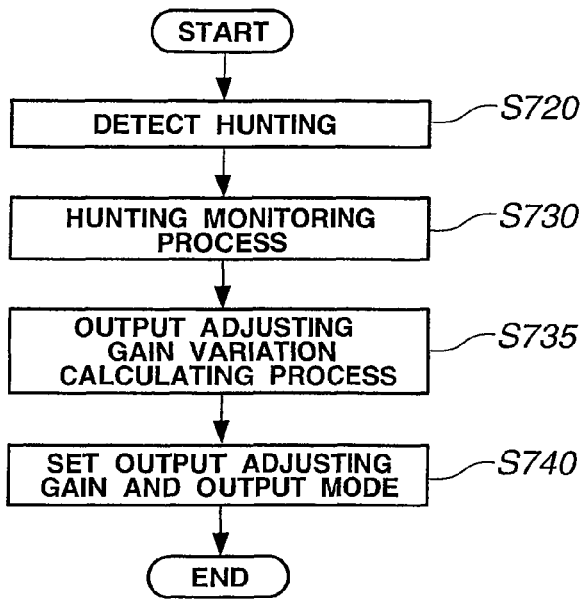
FIG. 19 is a flowchart showing an output adjusting gain and output mode setting process according to a second embodiment.

Next, explanation is given on a second embodiment. Since the basic construction is the same as that of the first embodiment, the explanation is directed only to points different from the first embodiment. FIG. 19 shows, in the form of a flowchart, a process, according to the second embodiment, of setting the output adjusting gain and the output mode. A hunting detecting process at a step S720 is the same as that of the first embodiment, and hence explanation is omitted.

Figure 20:
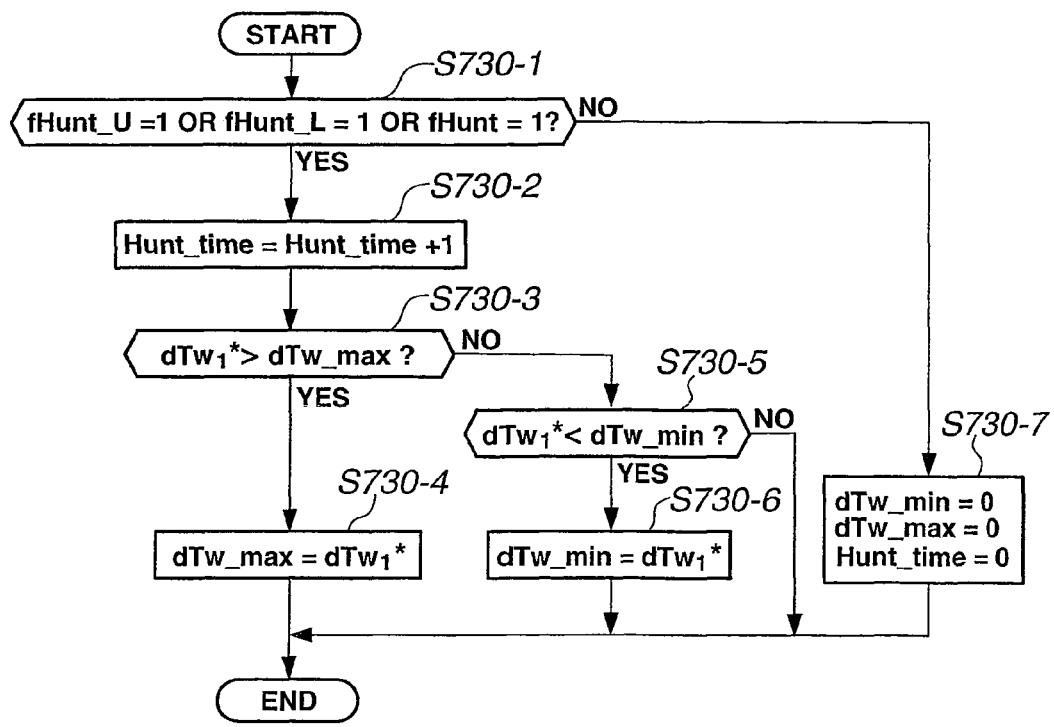
FIG. 20 is a flowchart showing steps in the vibration damping control process in the controller according to the second embodiment.

At a step S730, the controller calculates a maximum amplitude of the after-adjustment correction torque dTw1* and a hunting duration during judgment of hunting, in accordance with the hunting result detected at step S720. FIG. 20 is a flow chart showing the vibration damping control process performed by the controller according to the second embodiment.

At a step S730-1, the controller examines whether any one of the upper limit threshold reaching flag fHunt_U, lower limit threshold reaching flag fHunt_L and hunting flag fHunt is one, or not. In the case of YES, the controller proceeds to a step S730-2, and adds one to a hunting duration Hunt_Time. At a step S730-3, the controller examines whether the after-adjustment correction torque dTw1* is greater than a correction torque maximum value dTw_max. In the case of YES, the controller sets the maximum correction toque dTw_max equal to the after-adjustment correction torque dTw1*, at a step S730-4, and then terminates the process of FIG. 20.

In the case of NO at S730-3, the controller proceeds to a step S730-5, and examines whether the after-adjustment correction torque dTw1* is smaller than a minimum correction torque dTw_min. In the case of YES, the controller proceeds to a step S730-6, sets the minimum correction toque dTw_min equal to the after-adjustment correction toque dTw1*, and then terminates the process of FIG. 20. In the case of NO, the controller terminates the process directly.

In the case of NO at step S730-1, the controller clears the minimum correction torque dTw_min, maximum correction toque dTw_max and hunting duration Hunt_time at a step S730-7, and then terminates the process.

At a step S735, the controller calculates a decrement or decrease quantity ΔKd and an increment or increase quantity ΔKu of the output adjusting gain Kout, in accordance with the minimum correction toque dTw_min, maximum correction torque dTw_max and hunting duration Hunt_time calculated at step S730. This process is shown in FIGS. 21-25.

Figure 21:
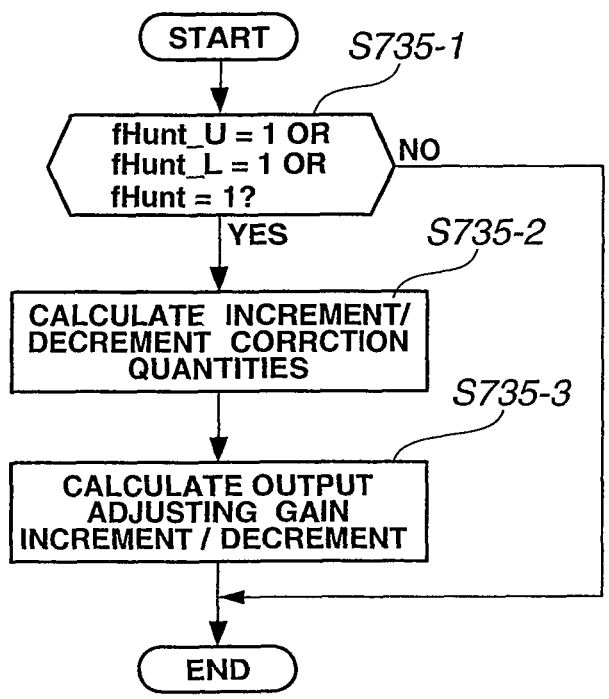
FIG. 21 is a flowchart showing a process performed at a step S735 according to the second embodiment.

FIG. 21 is a flow chart showing the process performed at step S735 of the second embodiment.

At a step S735-1, the controller examines whether any one of the upper limit threshold reaching flag fHunt_U, lower limit threshold reaching flag fHunt_L and hunting flag fHunt is equal to one. In the case of YES, the controller proceeds to a step S735-2, and calculates correction quantities of the output adjusting gain decrement and the output adjusting gain increment, in accordance with the minimum correction torque dTw_min, maximum correction torque dTw_max and hunting duration Hunt_time calculated at Step S730.

The output adjusting gain decrement correction quantities are calculated in a following manner.

A greatest value dTw_pp of the oscillation amplitude of after-adjustment correction torque dTw1* during the judgment of hunting is calculated by a following equation.

$$dTw\_pp = dTw\_max - dTw\_min$$

Figure 22:
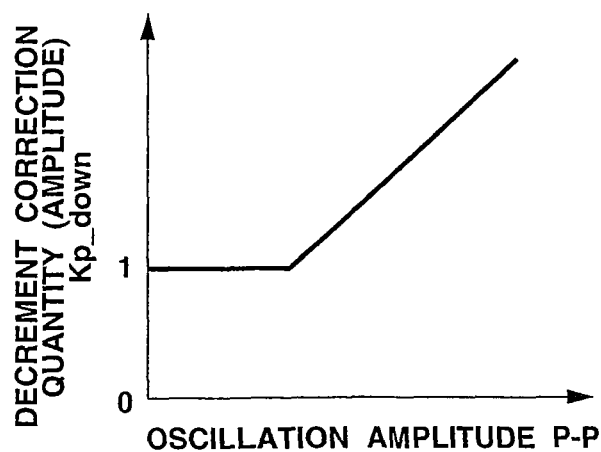
FIG. 22 is a view showing a map for calculating an output adjusting gain decrement correction quantity based on oscillation amplitude, according to the second embodiment.

In accordance with the thus-calculated greatest amplitude dTw_pp of the amplitude, the controller calculates an output adjusting gain decrement correction quantity Kp_down from a map as shown in FIG. 22. Concretely, the controller determines the output adjusting gain decrement correction quantity Kp_down which is increased as the oscillation amplitude becomes greater.

Figure 23:
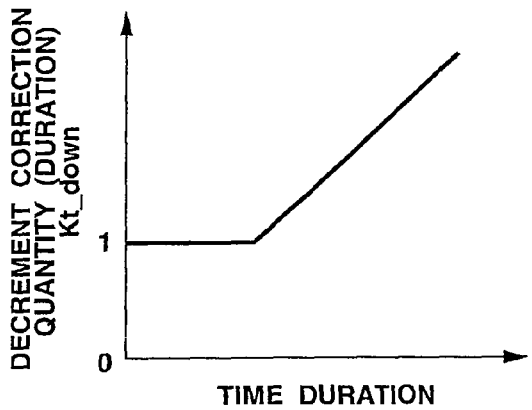
FIG. 23 is a view showing a map for calculating an output adjusting gain decrement correction quantity based on a hunting duration, according to the second embodiment.

Moreover, the controller calculates an output adjusting gain decrement correction quantity Kt_down in accordance with the hunting duration Hunt_time, from a map as shown in FIG. 23. Concretely, the controller determines the output adjusting gain decrement correction quantity Kt_down which is increased as the hunting duration becomes longer.

Similarly, the output adjusting gain increment correction quantities are calculated in a following manner.

Figure 24:
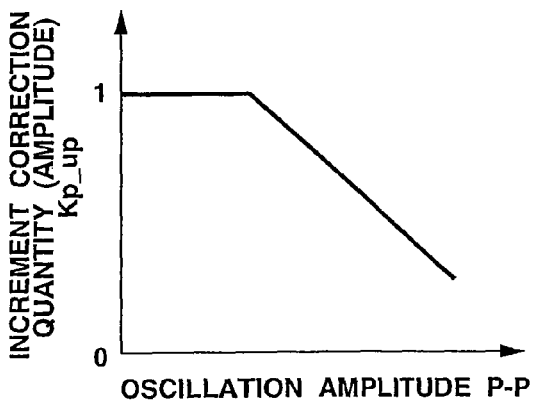
FIG. 24 is a view showing a map for calculating an output adjusting gain increment correction quantity based on oscillation amplitude, according to the second embodiment.

In accordance with the greatest amplitude dTw_pp, the controller calculates an output adjusting gain increment correction quantity Kp_up from a map shown in FIG. 24. Concretely, the controller determines the output adjusting gain increment correction quantity Kp_up which is decreased as the oscillation amplitude becomes greater. In other words, the control system returns the output more gradually when the oscillation amplitude is greater.

Figure 25:
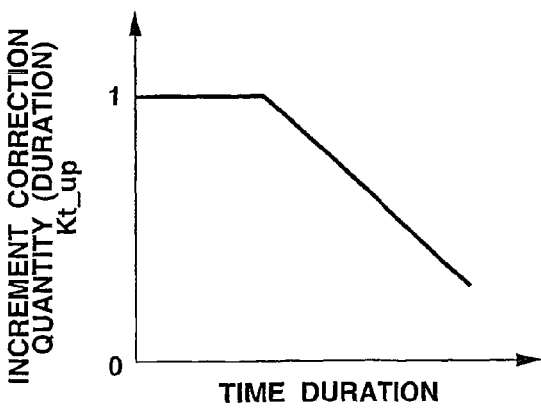
FIG. 25 is a view showing a map for calculating an output adjusting gain increment correction quantity based on a hunting duration, according to the second embodiment.

Moreover, the controller calculates an output adjusting gain increment correction quantity Kt_up in accordance with the hunting duration Hunt_time, from a map as shown in FIG. 25. Concretely, the controller determines the output adjusting gain increment correction quantity Kt_up which is decreased as the hunting duration becomes longer. In other words, the control system returns the output more gradually when the hunting duration is longer.

At a step S735-3, the controller calculates the decrement or decrease quantity ΔKd and increment or increase quantity ΔKu of the output adjusting gain Kout from the output adjusting gain correction quantities calculated at step S735-2.

From the output adjusting gain decrement correction quantity Kp_down and the output adjusting gain decrement correction quantity Kp_down, the decrement ΔKd of the output adjusting gain Kout is determined according to a following equation.

$$\Delta Kd = Kp\_down \cdot Kt\_down \cdot \Delta Kd0$$

In this equation, ΔKd0 is a predetermined output adjusting gain decrement standard value. In other words, the output adjusting gain decrement ΔKd is increased as the oscillation amplitude increases and as the hunting duration becomes longer.

Similarly, from the output adjusting gain increment correction quantity Kp_up and the output adjusting gain increment correction quantity Kt_up, the increment ΔKu of the output adjusting gain Kout is determined according to a following equation.

$$\Delta Ku = Kp\_up \cdot Kt\_up \cdot \Delta Ku0$$

In this equation, ΔKu0 is a predetermined output adjusting gain increment standard value. In other words, the output adjusting gain increment ΔKu is increased as the oscillation amplitude increases and as the hunting duration becomes longer.

The output adjusting gain decrement ΔKd and output adjusting gain increment ΔKu are determined by the above-mentioned algorithm. Therefore, at the time of return of the correction torque, the control system can impose the restriction to decrease the output of the correction torque command at the time of return of the correction torque as the amplitude of the correction torque at the time of hunting becomes greater and as the hunting duration becomes longer, and remove the restriction gradually.

Figure 26:
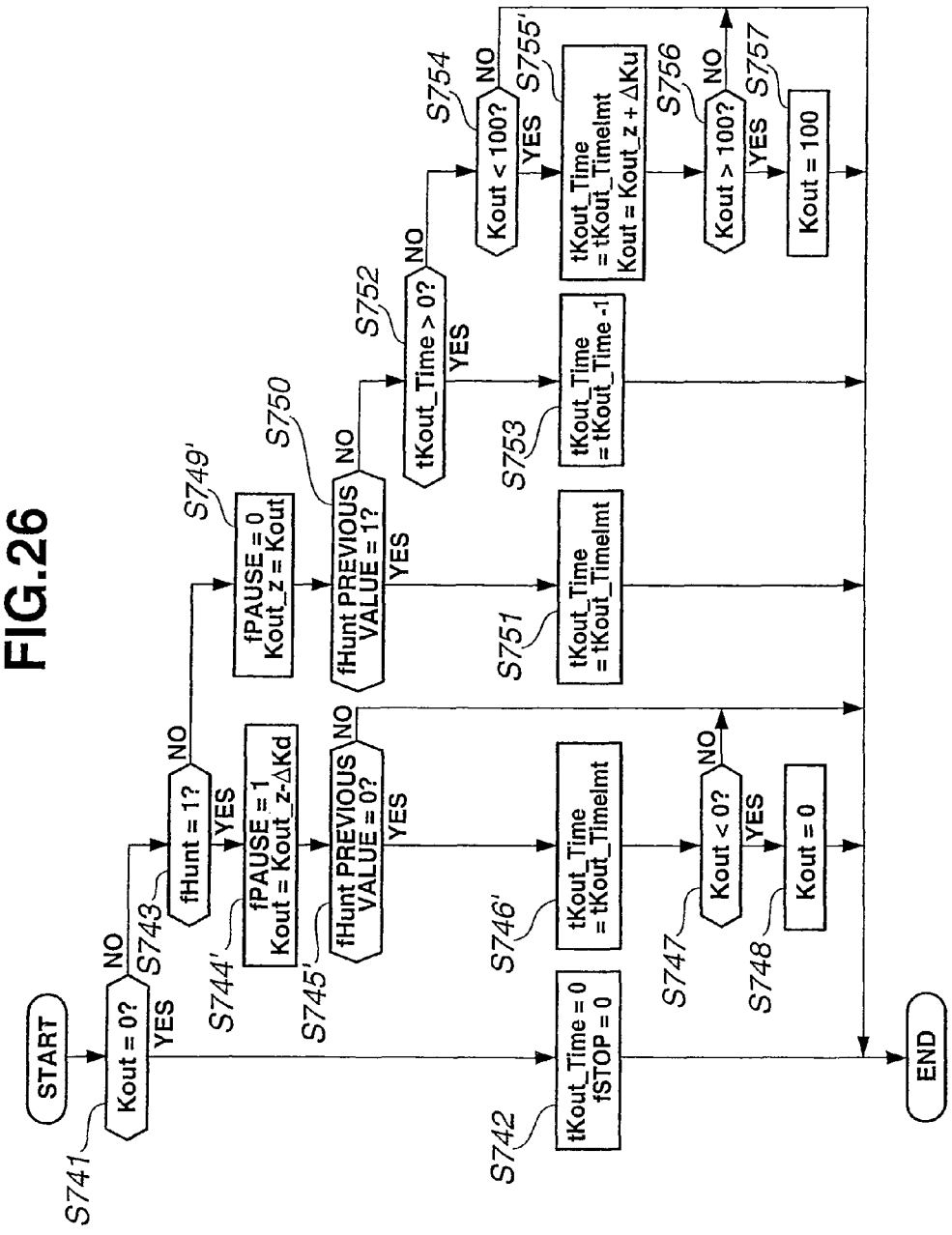
FIG. 26 is a flowchart showing a process according to the second embodiment, for setting the output adjusting gain and output mode.

At the step S740, the controller sets the output adjusting gain and the output mode, in accordance with the hunting result detected at step S720. FIG. 26 shows, in the form of a flowchart, a process of setting the output adjusting gain and the output mode according to the second embodiment.

At a step S741, the controller examines whether the output adjusting gain Kout is zero or not. In the case of YES, the controller proceeds to a step S742. At step S742, the controller resets an output adjusting gain return timer tKout_Time to zero, and sets a control stop flag fSTOP to one. When the control stop flag fSTOP is set at one, the output is not returned or restored even if the hunting state ends.

In the case of NO at S741, the controller proceeds to a step S743, and examines whether the hunting flag fHunt is one or not. In the case of YES, the controller proceeds to a step S744', and sets a control pause flag fPAUSE to one on the assumption that the hunting state is present. Furthermore, at step S744'. the controller calculates the output adjusting gain Kout according to a following equation.

$$Kout = Kout\_z - \Delta Kd$$

In this way, by calculating the output adjusting gain Kout from the decrement ΔKd of the output adjusting gain Kout calculated on the basis of the greatest value dTw_pp of the oscillation amplitude and the hunting duration, the control system can impose restriction so as to make the output smaller at the time of return of the correction torque, as the amplitude of the correction torque in hunting is greater and as the hunting duration is longer.

At a step S745, the controller examines whether the previous value of the hunting flag fHunt is zero or not. In the case of YES, at a step S746', the controller sets the output adjusting gain return timer tKout_time equal to an output adjusting gain return time period tKout_Timelmt. In the case of NO, the controller proceeds to a step S747.

At step S747, the controller examines whether the output adjusting gain Kout is negative or not. In the case of YES, the controller sets the output adjusting gain to zero at a step S748, and then terminates the process of FIG. 26. In the case of NO, the controller terminates the process directly.

In the case of NO at S743, the controller proceeds to a step S749', and resets the control pause flag fPAUSE to zero on the assumption that the hunting state ends. Furthermore, at step S749', the controller sets Kout_z equal to Kout.

At a step S750, the controller examines whether the previous value of the hunting flag fHunt is equal to one or not. In the case of YES, the controller proceeds to a step S751, and sets the output adjusting gain return timer tKout_Time equal to the output adjusting gain return time period tKout_Time lmt. In the case of NO, the controller proceeds to a step S752, and examiners whether the output adjusting gain return timer tKout_Time is positive or not.

In the case of YES at S752, the controller proceeds to a step S753, and decreases the output adjusting gain return timer tKout_Time by one. In the case of NO, the controller proceeds to a step S754, and examines whether the output adjusting gain Kout is smaller than 100 or not.

In the case of NO at S754, the controller terminates the process directly. In the case of YES, the controller proceeds to a step S755', and sets the output adjusting gain return timer tKout_Time equal to the output adjusting gain return time period tKout_Time lmt, and calculates the output adjusting gain Kout according to a following equation.

$$Kout = Kout\_z + \Delta Ku$$

In this way, by calculating the output adjusting gain Kout from the increment ΔKu of the output adjusting gain Kout calculated on the basis of the greatest value dTw_pp of the oscillation amplitude and the hunting duration, the control system can remove the restriction more gradually at the time of removing the correction torque output restriction, as the amplitude of the correction torque in hunting is greater and as the hunting duration is longer.

At a step S756, the controller examines whether the output adjusting gain Kout is greater than 100 or not. In the case of NO, the controller terminates the program directly. In the case of YES, the controller set the output adjusting gain Kout equal to 100 at a step S757, and then terminates the program.

As explained above, the second embodiment can provide following effects and advantages in addition to the effects (1)~(4) of the first embodiment.

(5) The correction toque outputting means or device measures, by counting, a time duration during which the state in which the amplitude of the correction torque is greater than or equal to the predetermined amplitude continues, and sets the output adjusting gain at a smaller value as the time duration measured by counting is longer. In other words, the restriction ΔKd=Kp_down·Kt_down·ΔKd0 [0075] is increased at the time of return of the correction torque dTw*.

When the hunting duration is long, there is a high possibility of traveling on a rough road and there is a high possibility of causing hunting again at the time of removal of the restriction. Therefore, by imposing the restriction to make smaller the output of the correction torque command with restriction at the time of return of the correction torque, the control system can suppress hunting effectively.

(6) The correction toque outputting means or device sets the output adjusting gain at a smaller value as the amplitude fo the correction torque is greater at the time of output of the hunting time correction torque command. In other words, the restriction ΔKd=Kp_down·Kt_down·ΔKd0 [0075] on the correction torque is increased at the time of return of the correction torque dTw*.)

When the amplitude at the time of hunting is great, there is a high possibility of travel on a rough road and there is a high possibility of causing hunting again at the time of removal of the restriction. Therefore, by imposing the restriction to make smaller the output of the correction torque command with restriction at the time of return of the correction torque, the control system can suppress hunting effectively.

(7) The correction toque outputting means or device makes smaller an increment or increase quantity ΔKu of the output adjusting gain Kout as the amplitude of the correction torque is greater after start of outputting the hunting time correction torque command. In other words, the restriction is removed so as to resume the output of correction toque dTw* gradually.

When the hunting amplitude is great, there is a high possibility of travel on a rough road and there is a high possibility of causing hunting again at the time of removal of the restriction. Therefore, by returning the correction torque gradually, at the time of return of the correction torque, the control system can prevent reoccurrence of hunting effectively.

(8) The correction toque outputting means or device measures, by counting, a time duration during which the state in which the amplitude of the correction torque is greater than or equal to the predetermined amplitude continues, and makes smaller an increment or increase quantity ΔKu of the output adjusting gain Kout as the counted time duration is loner. In other words, the restriction is removed so as to return the output of correction torque dTw* gradually.

When the hunting duration is long, there is a high possibility of traveling on a rough road and there is a high possibility of causing hunting again at the time of removal of the restriction. Therefore, by returning the correction torque command gradually at the time of return of the correction torque, the control system can prevent reoccurrence of hunting effectively.

Although explanation is given to the first and second embodiments in which the present invention is applied to a vibration damping or suppressing apparatus, various other constructions are included in the present invention. For example, the vehicle may be a hybrid vehicle including a motor, or an electric vehicle using only a motor as the driving source although the embodiments employ the construction equipped with the engine that is an internal combustion engine as a driving source of the driving/braking torque producing means or device.

Moreover, as a brake actuator of the driving/braking torque producing means or device, the illustrated construction is arranged to produce a braking force by pressing a caliper with a brake pad. However, it is optional to utilize a regenerative braking force of a motor or the like. Furthermore, instead of a hydraulic brake, it is possible to employ a construction including an electric caliper. In the case of the electric vehicle including a motor/generator, the driving/braking torque producing means or device includes only the motor/generator. Therefore, it is possible to output a signal combining the driving torque and braking torque in the form of a torque signal supplied to the motor/generator.

The illustrated embodiments employ the construction using the front and rear two-wheel model having the front and rear suspensions with respect to the vehicle body, and calculating the correction torque to suppress pitching vibration and bouncing vibration of the vehicle. However, for example, it is possible to employ the construction using a four wheel model, and calculating the correction torque to suppress rolling vibration as well as the pitching vibration and bouncing vibration.

The invention claimed is:

1. A vibration damping control apparatus for a vehicle, the vibration damping control apparatus comprising:
    a driving/braking torque producing section configured to produce a driving/braking torque of a wheel of the vehicle;
    a correction torque calculating section configured to calculate a correction torque to suppress a vehicle body sprung vibration; and
    a correction torque command outputting section configured to output a correction torque command to the driving/braking torque producing section, in accordance with the correction torque;
    the correction torque command outputting section being configured to output a hunting time correction torque command smaller than a normal time correction torque command when a state in which an amplitude of the correction torque is greater than or equal to a predetermined amplitude continues for a predetermined time length,
    thereafter, to output a returning time correction torque command restricted with restriction on the correction torque as an output of the correction torque command if a state in which the amplitude of the correction torque is smaller than or equal to a predetermined amplitude continues for a first predetermined time length, and
    thereafter, to return the output of the correction torque command from the returning time correction torque command to the normal time correction torque command when a state in which the amplitude of the correction torque is smaller than or equal to a predetermined amplitude continues for a second predetermined time length while the returning time correction torque command is being outputted.

2. The vibration damping control apparatus as claimed in claim 1, wherein the correction torque command outputting section is configured to impose the restriction to decrease the output of the correction torque as compared to the state in which the amplitude of the correction torque is smaller than or equal to the predetermined amplitude.

3. The vibration damping control apparatus as claimed in claim 1, wherein the correction torque command outputting section is configured to output the returning time correction torque command so that the restriction on the correction torque is increased as the amplitude of the correction torque is greater at a time of outputting the hunting time correction torque command.

4. The vibration damping control apparatus as claimed in claim 1, wherein the correction torque command outputting section is configured to remove the restriction to resume the output of the correction torque command more gradually as the amplitude of the correction torque after a start of the output of the hunting time correction torque command is greater.

5. The vibration damping control apparatus as claimed in claim 1, wherein the correction torque command outputting section is configured to measure, by counting, a time duration during which the state in which the amplitude of the correction torque is greater than or equal to the predetermined amplitude continues, and to remove the restriction to resume the output of the correction torque more gradually as the counted time duration is longer.

6. The vibration damping control apparatus as claimed in claim 1, wherein the correction torque command outputting section is configured to compare the amplitude of the correction torque calculated by the correction torque calculating section, with the predetermined amplitude.

7. The vibration damping control apparatus as claimed in claim 1, wherein the correction torque command outputting section includes a correction torque monitoring subsection configured to monitor the amplitude of the correction torque to examine whether the amplitude of the correction torque is smaller than or equal to the predetermined amplitude even while the returning time correction torque command is being outputted.

8. A vibration damping control apparatus for a vehicle, the vibration damping control apparatus comprising:
- a driving/braking torque producing section configured to produce a driving/braking torque of a wheel of the vehicle;
- a correction torque calculating section configured to calculate a correction torque to suppress a vehicle body sprung vibration; and
- a correction torque command outputting section configured to output a correction torque command to the driving/braking torque producing section, in accordance with the correction torque;
- the correction torque command outputting section being configured to output a hunting time correction torque command smaller than a normal time correction torque command when a state in which an amplitude of the correction torque is greater than or equal to a predetermined amplitude continues for a predetermined time length, and
- thereafter to return an output of the correction torque command from the hunting time correction torque command to the normal time correction torque command if a state in which the amplitude of the correction torque is smaller than or equal to a predetermined amplitude continues for a first predetermined time length,
- moreover, the correction torque command outputting section being configured to output a returning time correction torque command restricted with restriction on the correction torque before the output of the correction torque command is returned to the normal time correction torque command,
- the returning time correction torque command being produced, by measuring, by counting, a time duration during which the state in which the amplitude of the correction torque is greater than or equal to the predetermined amplitude continues, and by increasing the restriction on the correction torque as the time duration measured by counting is longer.

9. The vibration damping control apparatus as claimed in claim 8, wherein the correction torque command outputting section is configured to return the output of the correction torque command from the returning time correction torque command to the normal time correction torque command when the state in which the amplitude of the correction torque is smaller than or equal to the predetermined amplitude continues for a second predetermined time length while the returning time correction torque command is being outputted.

10. The vibration damping control apparatus as claimed in claim 8, wherein the correction torque command outputting section is configured to impose the restriction to decrease the output of the correction torque as compared to the state in which the amplitude of the correction torque is smaller than or equal to the predetermined amplitude.

11. The vibration damping control apparatus as claimed in claim 8, wherein the correction torque command outputting section is configured to compare the amplitude of the correction torque calculated by the correction torque calculating section, with the predetermined amplitude.

* * * * *